United States Patent
Park et al.

(10) Patent No.: US 9,661,560 B2
(45) Date of Patent: May 23, 2017

(54) SCANNING METHOD AND APPARATUS IN WIRELESS LAN

(71) Applicant: LG ELECTRONICS INC., Seoul (KR)

(72) Inventors: Giwon Park, Seoul (KR); Kiseon Ryu, Seoul (KR); Hangyu Cho, Seoul (KR); Jinsam Kwak, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 137 days.

(21) Appl. No.: 14/419,434

(22) PCT Filed: Aug. 8, 2013

(86) PCT No.: PCT/KR2013/007171
§ 371 (c)(1),
(2) Date: Feb. 3, 2015

(87) PCT Pub. No.: WO2014/025216
PCT Pub. Date: Feb. 13, 2014

(65) Prior Publication Data
US 2015/0208330 A1 Jul. 23, 2015

Related U.S. Application Data

(60) Provisional application No. 61/680,707, filed on Aug. 8, 2012, provisional application No. 61/692,684, filed on
(Continued)

(51) Int. Cl.
*H04L 1/00* (2006.01)
*H04W 48/16* (2009.01)
(Continued)

(52) U.S. Cl.
CPC ........... *H04W 48/16* (2013.01); *H04W 76/02* (2013.01); *H04W 84/12* (2013.01)

(58) Field of Classification Search
CPC ............ H04B 7/18528; H04B 7/18571; H04B 7/18576; H04B 7/2121; H04B 7/2123;
(Continued)

(56) References Cited

U.S. PATENT DOCUMENTS 6,327,254 B1 12/2001 Chuah
2006/0092888 A1 5/2006 Jeong et al.
(Continued)

FOREIGN PATENT DOCUMENTS

| KR | 10-2010-0067974 | 6/2010 |
| WO | 2007116337 A2 | 10/2007 |
| WO | 2011115448 A2 | 9/2011 |

OTHER PUBLICATIONS

European Patent Office Application No. 13827067.3, Search Report dated Mar. 15, 2016, 9 pages.
(Continued)

*Primary Examiner* — Dady Chery
(74) *Attorney, Agent, or Firm* — Lee Hong Degerman Kang Waimey

(57) ABSTRACT

A scanning method and apparatus in wireless LAN is disclosed. The method comprises determining, by an access point (AP), whether to accommodate a station (STA) conducting an initial link setup and transmitting, by the AP, a frame to the STA, the frame including scanning redirection information for the STA to switch other channel, other band, or a neighbor AP when the AP determines not to accommodate the STA. The scanning redirection information includes a band field and a channel field. The band field indicating a band in which the STA conducts the initial link setup when the STA conducts the initial link setup from current band to the other band. The channel field indicating a channel in
(Continued)

which the STA conducts the initial link setup when the STA conducts the initial link setup from current channel to the other channel.

10 Claims, 22 Drawing Sheets

Related U.S. Application Data on Aug. 23, 2012, provisional application No. 61/696,228, filed on Sep. 3, 2012, provisional application No. 61/696,812, filed on Sep. 5, 2012, provisional application No. 61/699,298, filed on Sep. 11, 2012, provisional application No. 61/712,788, filed on Oct. 11, 2012, provisional application No. 61/719,931, filed on Oct. 29, 2012, provisional application No. 61/725,020, filed on Nov. 11, 2012, provisional application No. 61/725,481, filed on Nov. 13, 2012, provisional application No. 61/725,579, filed on Nov. 13, 2012, provisional application No. 61/726,501, filed on Nov. 14, 2012, provisional application No. 61/750,808, filed on Jan. 10, 2013, provisional application No. 61/751,951, filed on Jan. 14, 2013, provisional application No. 61/752,371, filed on Jan. 14, 2013, provisional application No. 61/752,451, filed on Jan. 15, 2013, provisional application No. 61/775,706, filed on Mar. 11, 2013.

(51) Int. Cl.
*H04W 76/02* (2009.01)
*H04W 84/12* (2009.01)

(58) Field of Classification Search
CPC ..... H04W 84/06; H04W 72/04; H04W 72/12; H04W 76/00; H04W 84/04; H04W 88/06; H04J 2203/0069; H04Q 2213/394; H04L 12/4604
USPC ................................ 370/338, 328, 329, 346
See application file for complete search history.

(56) References Cited

U.S. PATENT DOCUMENTS

| | | |
|---|---|---|
| 2007/0123254 A1 | 5/2007 | Choi et al. |
| 2007/0213012 A1 | 9/2007 | Marin et al. |
| 2008/0186914 A1 | 8/2008 | Na |
| 2011/0053521 A1* | 3/2011 | Cordeiro ............... H04W 36/06 455/73 |
| 2013/0114586 A1 | 5/2013 | Kim et al. |

OTHER PUBLICATIONS

PCT International Application No. PCT/KR2013/007171, Written Opinion of the International Searching Authority dated Oct. 25, 2013, 1 page.

\* cited by examiner

FIG. 1
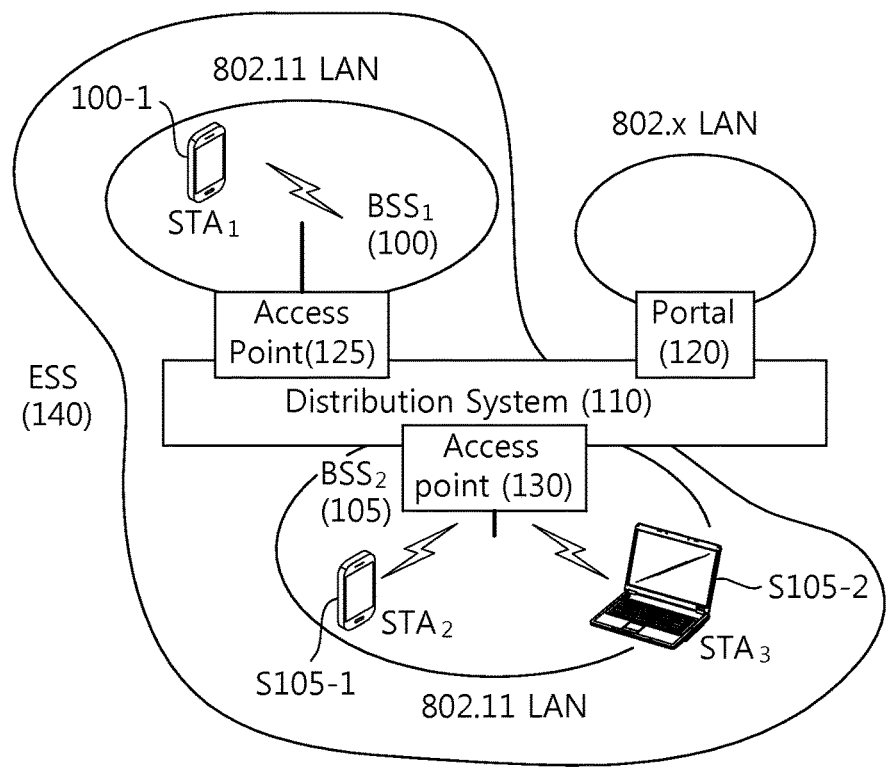
(A)
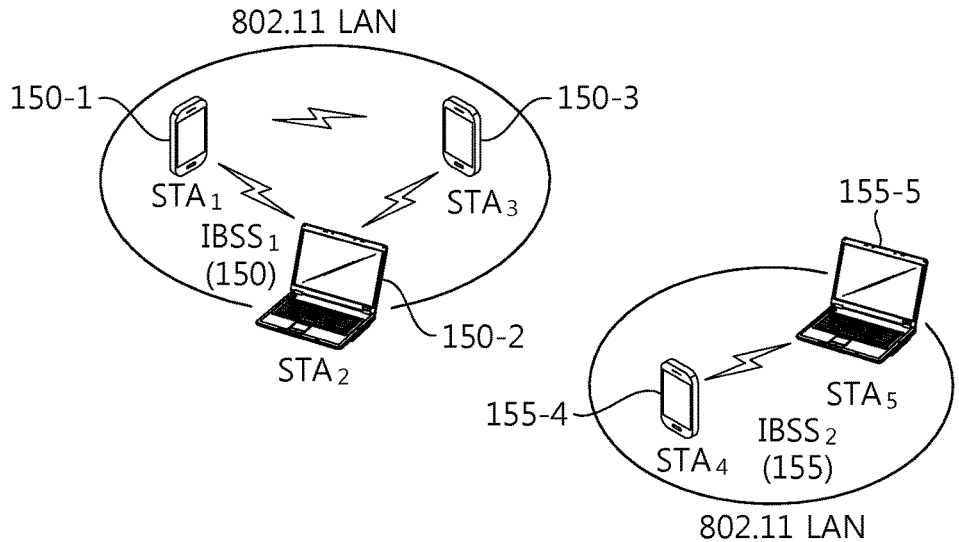
(B)

Redirect AP Information

FIG. 16

| Redirect Type | Operating Class and Channel Number Presence Indicator | BSSID Presence Indicator | TBTT Information Presence Indicator | Operating Class | Channel Number | BSSID | TBTT Information Header | TBTT information field #1 | ... | TBTT information field #n (optional) |
|---|---|---|---|---|---|---|---|---|---|---|

| Element ID | Length | Reduced Neighbor Report Type | Neighbor AP Information field #1 | Neighbor AP Information field #1 (optional) | ... | Neighbor AP Information field #n (optional) |
|---|---|---|---|---|---|---|

| TBTT offset in TU | optional subelement |

…

SCANNING METHOD AND APPARATUS IN WIRELESS LAN

CROSS-REFERENCE TO RELATED APPLICATIONS

This application is the National Stage filing under 35 U.S.C. 371 of International Application No. PCT/KR2013/007171, filed on Aug. 8, 2013, which claims the benefit of U.S. Provisional Application Ser. No. 61/680,707, filed on Aug. 8, 2012, 61/692,684, filed on Aug. 23, 2012, 61/696,228, filed on Sep. 3, 2012, 61/696,812, filed on Sep. 5, 2012, 61/699,298, filed on Sep. 11, 2012, 61/712,788, filed on Oct. 11, 2012, 61/719,931, filed on Oct. 29, 2012, 61/725,020, filed on Nov. 11, 2012, 61/725,481, filed on Nov. 13, 2012, 61/725,579, filed on Nov. 13, 2012, 61/726,501, filed on Nov. 14, 2012, 61/750,808, filed on Jan. 10, 2013, 61/751,951, filed on Jan. 14, 2013, 61/752,371, filed on Jan. 14, 2013, 61/752,451, filed on Jan. 15, 2013, and 61/775,706, filed on Mar. 11, 2013, the contents of which are all hereby incorporated by reference herein in their entirety.

TECHNICAL FIELD

The present invention relates to a scanning method and apparatus and, more particularly, to a method and apparatus of scanning a station (STA).

BACKGROUND ART

Recently, wireless LAN technologies are advancing in three directions. In an effort to further increase a transfer rate as extensions in the evolution of the existing wireless LAN, IEEE (institute of electrical and electronic engineers) 802.11ac and IEEE 802.11ad have been introduced. IEEE 802.11ad is a wireless technology using a 60 GHz band. Also, in order to allow for wider area transmission in terms of distance, relative to the existing wireless LAN, a wide area wireless LAN utilizing a frequency band less than 1 GHz has recently been emerged, which includes IEEE 802.11af utilizing a TVWS (TV white space) band and IEEE 802.11ah utilizing a 900 MHz band. These schemes aim at extending an extended range Wi-Fi service, as well as a smart grid and a wide are sensor network. Also, an existing wireless LAN MAC (medium access control) technology has a problem in that an initial link setup time is very lengthened according to circumstances. In order to solve the problem, 802.11ai standardization activity has been actively ongoing to allow a station (STA) to quickly access an access point (AP).

IEEE 802.11ai, a MAC technology handling a prompt authentication procedure to remarkably reduce an initial setup and association time of a wireless LAN, was started to be standardized in January 2011 by a formal task group. In order to allow for a rapid access procedure, IEEE 802.11ai is under discussion to simplify a procedure in regions such as AP discovery, network discovery, TSF (time synchronization function) synchronization, authentication & association, merging of a procedure with a higher layer, and the like. Among them, ideas such as procedure merging utilizing piggyback of DHCP (dynamic host configuration protocol), optimization of full EAP (extensible authentication protocol) using a concurrent IP, effective selective AP scanning, and the like, has been actively discussed.

SUMMARY OF INVENTION

Technical Problem

The present invention provides a scanning method. The present invention also provides an apparatus for performing scanning.

Technical Solution

In an aspect, a method for communication in a wireless local area network (WLAN) may include: determining, by an access point (AP), whether to accommodate a station (STA) conducting an initial link setup; and transmitting, by the AP, a frame to the STA. The frame may include scanning redirection information for the STA to switch to a different channel, a different band, or a neighbor AP when the AP determines not to accommodate the STA. The scanning redirection information may include a band field and a channel field, the band field includes information regarding a band in which the STA conducts the initial link setup when the STA conducts the initial link setup from current band to the other band, and the channel field may include channel information in which the STA conducts the initial link setup when the STA conducts the initial link setup from current channel to the other channel.

In another aspect, an access point (AP) is configured to communicate in a wireless local area network, the AP may comprise a radio frequency (RF) unit and a processor. The processor may be configured to determine whether to accommodate a station (STA) conducting an initial link setup, and the RF unit may be configured to transmit a frame to the STA. The frame may include scanning redirection information for the STA to switch to a different channel, a different band, or a neighbor AP when the AP determines not to accommodate the STA. The scanning redirection information may include a band field and a channel field, the band field indicating a band in which the STA conducts the initial link setup when the STA conducts the initial link setup from current band to the other band, the channel field indicating a channel in which the STA conducts the initial link setup when the STA conducts the initial link setup from current band to the other band.

Advantageous Effects

According to embodiments of the present invention, a scanning procedure can be quickly performed.

DESCRIPTION OF DRAWINGS

FIG. 1 is a conceptual view illustrating a structure of a wireless LAN.

FIG. 16 is a conceptual view illustrating scanning AP redirection information according to an embodiment of the present invention.

FIG. 17 is a conceptual view illustrating scanning AP redirection information according to an embodiment of the present invention.

FIG. 20 is a conceptual view illustrating a TBTT information field according to an embodiment of the present invention.

MODE FOR INVENTION

FIG. 1 is a conceptual view illustrating a structure of a wireless local area network (WLAN).

(A) of FIG. 1 illustrates a structure of an infrastructure network of IEEE (institute of electrical and electronic engineers) 802.11.

Referring to (A) of FIG. 1, the WLAN system may include one or more basic service sets (BSSs) 100 and 105. The BSSs 100 and 105 are sets of an access point (AP) and a station (STA) such as an AP and an STA1 100-1 that may be successfully synchronized to communicate with each other, but without a concept indicating a particular region. The BSS 105 may include one or more STAs 105-1 and 105-2 that may be associated with a single AP 130.

An infrastructure BSS may include at least one STA, APs 125 and 130 providing a distribution service, and a distribution system (DS) 110 connecting a plurality of APs.

The distribution system 110 may connect several BSSs 100 and 105 to implement an extended service set (ESS) 140. The ESS 140 may be used as a term indicating a single network formed by connecting one or several APs 125 and 130 through the DS 110. APs included in the single ESS 140 may have the same SSID (service set identification).

A portal 120 may serve as a bridge connecting a WLAN network (IEEE 802.11) and a different network (e.g., 802.X).

In the infrastructure network such as (A) of FIG. 1, a network between the APs 120 and 130 and a network between the APs 125 and 130 and the STAs 100, 105-1, and 105-2 may be implemented. However, without the APs 125 and 130, a network may also be established between STAs to perform communication. A network established between STAs to perform communication, without the APs 125 and 130, will be defined as an ad-hoc network or an independent BSS (IBSS).

(B) of FIG. 1 is a conceptual view illustrating an IBSS.

Referring to (B) of FIG. 1, the IBSS is a BSS operating in an ad-hoc mode. Since the IBSS does not include an AP, it does not have a centralized management entity. Namely, in the IBSS, the STAs 150-1, 150-2, 150-3, 155-4, and 155-5 are managed in a distributed manner. In the IBSS, all the STAs 150-1, 150-2, 150-3, 155-4, and 155-5 may be configured as mobile STAs, and the IBSS establishes a self-contained network in which access to a distribution system (DS) is not permitted.

A station (STA) is a certain functional medium including a medium access control (MAC) following the stipulation of the IEEE 802.11 standard and a physical layer interface with respect to a wireless medium. An STA includes both AP and non-AP stations in a broad sense.

An STA may be called by various other names such as mobile terminal, wireless device, wireless transmit/receive unit (WTRU), user equipment (UE), mobile station (MS), mobile subscriber unit (MSU), user, or the like.

Figure 2:
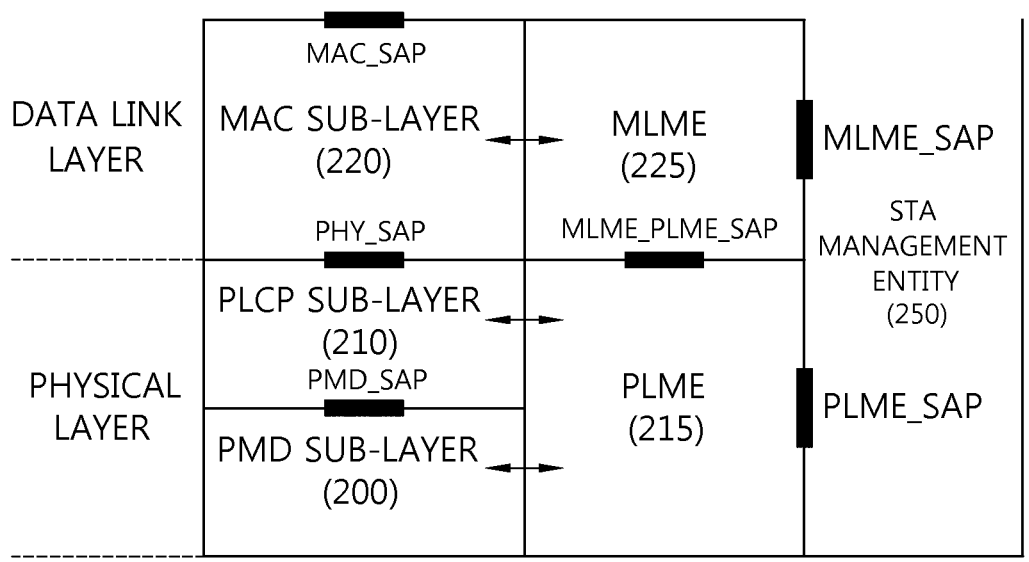
FIG. 2 is a view illustrating a hierarchical architecture of a wireless LAN system supported by IEEE 802.11.

FIG. 2 is a view illustrating a hierarchical architecture of a wireless LAN system supported by IEEE 802.11.

In FIG. 2, a hierarchical architecture of the WLAN system is illustrated conceptually.

The hierarchical architecture of the WLAN system may include a MAC (medium access control) sublayer 220, a PLCP (Physical Layer Convergence Procedure) sublayer 210, and a PMD (Physical Medium Dependent) sublayer 200. The PLCP sublayer 210 is implemented such that the MAC sublayer 220 operates with minimum dependency on the PMD sublayer 200. The PMD sublayer 200 may serve as a transmission interface to transmitting and receiving data between a plurality of STAs.

The MAC sublayer 220, the PLCP sublayer 210, and the PMD sublayer 200 may include a management entity conceptually.

A management entity of the MAC sublayer 220 may be an MLME (MAC Layer Management Entity) 225, and a management entity of the physical layer may be a PLME (PHY Layer Management Entity) 215. These management entities may provide an interface in which a layer management operation is performed. The PLME 215 may be connected to the MLME 225 to perform a management operation of the PLCP sublayer 210 and the PMD sublayer 200, and the MLME 225 may be connected to the PLME 215 to perform a management operation of the MAC sublayer 220.

In order to properly perform a MAC layer operation, an SME (STA management entity) 250 may be provided. The SM3 250 may be operated as a component independent of a layer. The MLME, the PLME, and the SME may transmit and receive information between the mutual components on the basis of primitive.

Operations of the respective sublayers will be described briefly. The PLCP sublayer 210 may deliver an MPDU (MAC Protocol Data Unit) received from the MAC sublayer 220 to the PMD sublayer 200 according to an instruction from a MAC layer between the MAC sublayer 220 and the PMD layer 200, or may deliver a frame transmitted from the PMD sublayer 200 to the MAC sublayer 220. The PMD sublayer 200 as a PLCP lower layer may perform data transmission and reception between a plurality of STAs through a wireless medium. The MPDU delivered by the MAC sublayer 220 is called a PSDU (Physical Service Data Unit) in the PLCL sublayer 210. The MPDU is similar to a PSDU, but when an A-MPDU (aggregated MPDU) obtained by aggregating a plurality of MPDUs is delivered, each MPDU and a PSDU may be different.

When the PLCP sublayer 210 receives the PDSU from the MAC sublayer 220 and delivers it to the PMD sublayer 220, the PLCP sublayer 210 adds an additional field including information required for a physical layer transceiver to the PSDU. The additional field added to the PSDU may be a PLCP preamble, a PLCP header, tail bits required for returning a convolution encoder to a zero state, and the like. The PLCP preamble may serve to allow a receiver to prepare a synchronization function and antenna diversity before the PSDU is transmitted. A data field may include a coded sequence obtained by encoding a bit sequence including padding bits, a service field including a bit sequence for initializing a scrambler, and tail bits added to the PSDU. Here, as the encoding scheme, one of BCC (Binary Convolutional Coding) encoding and LDPC (Low Density Parity Check) encoding may be selected according to an encoding scheme supported by an STA that receives a PPDU (PLCP Protocol Data Unit). A PLCP header may include a field including information regarding the PPDU to be transmitted.

The PLCP sublayer 210 generates a PPDU by adding the foregoing field to the PSDU and transmits the same to a reception station through the PMD sublayer 200, and upon receiving the PPDU, the reception station restores the PPDU by obtaining information required to store the data from a PLCP preamble and a PLCP header.

Figure 3:
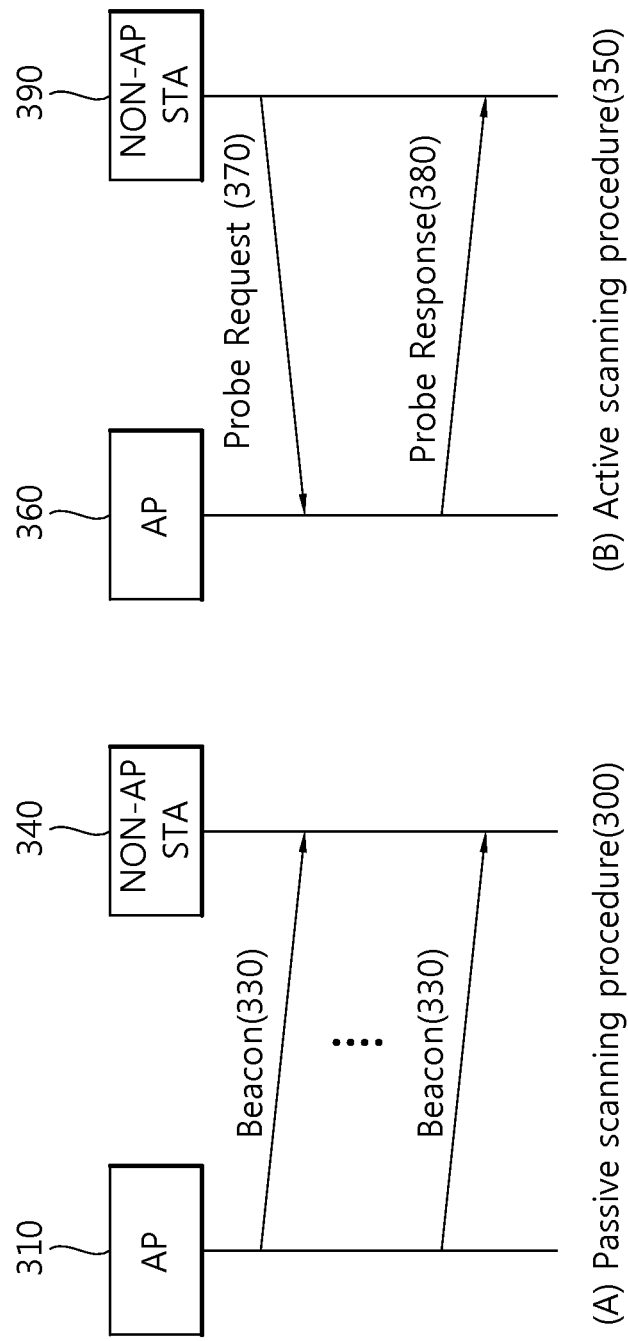
FIG. 3 is a conceptual view illustrating a scanning method in a wireless LAN.

FIG. 3 is a conceptual view illustrating a scanning method in a wireless LAN.

Referring to FIG. 3, the scanning method may be divided into passive scanning 300 and active scanning 350.

Referring to (A) of FIG. 3, the passive scanning 300 may be performed by a beacon frame 330 periodically broadcast by an AP 310. The AP 310 of the WLAN broadcasts the beacon frame 330 to a non-AP STA 340 at every particular period (e.g., 100 msec). The beacon frame 330 may include information regarding a current network. Upon receiving the periodically broadcast beacon frame 330, the non-AP STA 340 may receive network information to perform scanning a channel and the AP 310 to perform authentication/association.

In the case of the passive scanning 300, the non-AP STA 340 may need only receive the beacon frame 330 transmitted from the AP 310, without having to transmit a frame. Thus, the passive scanning 30 is advantageous in that overall overhead generated by data transmission/reception is small. However, since scanning is performed passively in proportion to a period of the beacon frame 330, a time required for performing scanning is lengthened. Details of the beacon frame may refer to a 8.3.3.2 beacon frame disclosed in IEEE Draft P802.11-REVmb™/D12, November 2011 'IEEE Standard for Information Technology Telecommunications and information exchange between systems—Local and metropolitan area networks—Specific requirements Part 11: Wireless LAN Medium Access Control (MAC) and Physical Layer (PHY) Specifications (hereinafter, referred to as 'IEEE 802.11')' disclosed in November 2011. In IEEE 802.11 ai, a different format of beacon frame may be used additionally, and such a beacon frame may be called a FILS (fast initial link setup) beacon frame. Also, a measurement pilot frame, a frame including only partial information of a beacon frame, may be used in a scanning procedure. The measurement pilot frame is disclosed in an IEEE 802.11 8.5.8.3 measurement pilot format.

Also, an FILS discovery frame may be defined. The FILS discovery frame, a frame transmitted during a transmission period of a beacon frame from each AP, may be a frame transmitted with a period shorter than that of the beacon frame. Namely, the FILS discovery frame is a frame transmitted with a period having a value smaller than that of the transmission period of the beacon frame. The FILS discovery frame may include identification information (SSID, BSSID) of an AP that transmits a detection frame. The FILS discovery frame may be transmitted to an STA before the beacon frame is transmitted, to allow the STA to discover in advance that an AP exists in a corresponding channel. An interval during which the FILS discovery frame is transmitted in a single AP is called an FILS search frame transmission interval. A portion of information included in the beacon frame may be included in the FILS discovery frame and transmitted.

Referring to (B) of FIG. 3, the active scanning 350 refers to a method of performing scanning initiatively by a non-AP STA 390 by transmitting a probe request frame 370 to an AP 360.

When the AP 360 receives the probe request frame 370 from the non-AP STA 390, it may wait for a random time to prevent frame collision, add network information to a probe response frame 380, and transmit the same to the non-AP STA 390. The non-AP STA 390 may obtain the network information on the basis of the received probe response frame 380 and stop the scanning process.

In the case of the active scanning 350, since the non-AP STA 390 initiatively perform scanning, a time used for scanning is short. However, since the non-AP STA 390 should transmit the probe request frame 370, network overhead for transmitting and receiving frames is increased. The probe request frame 370 is disclosed in IEEE 802.11 8.3.3.9 and the probe response frame 380 is disclosed in IEEE 802.11 8.3.3.10.

After the scanning is finished, the AP and the STA may perform authentication and association processes.

Figure 4:
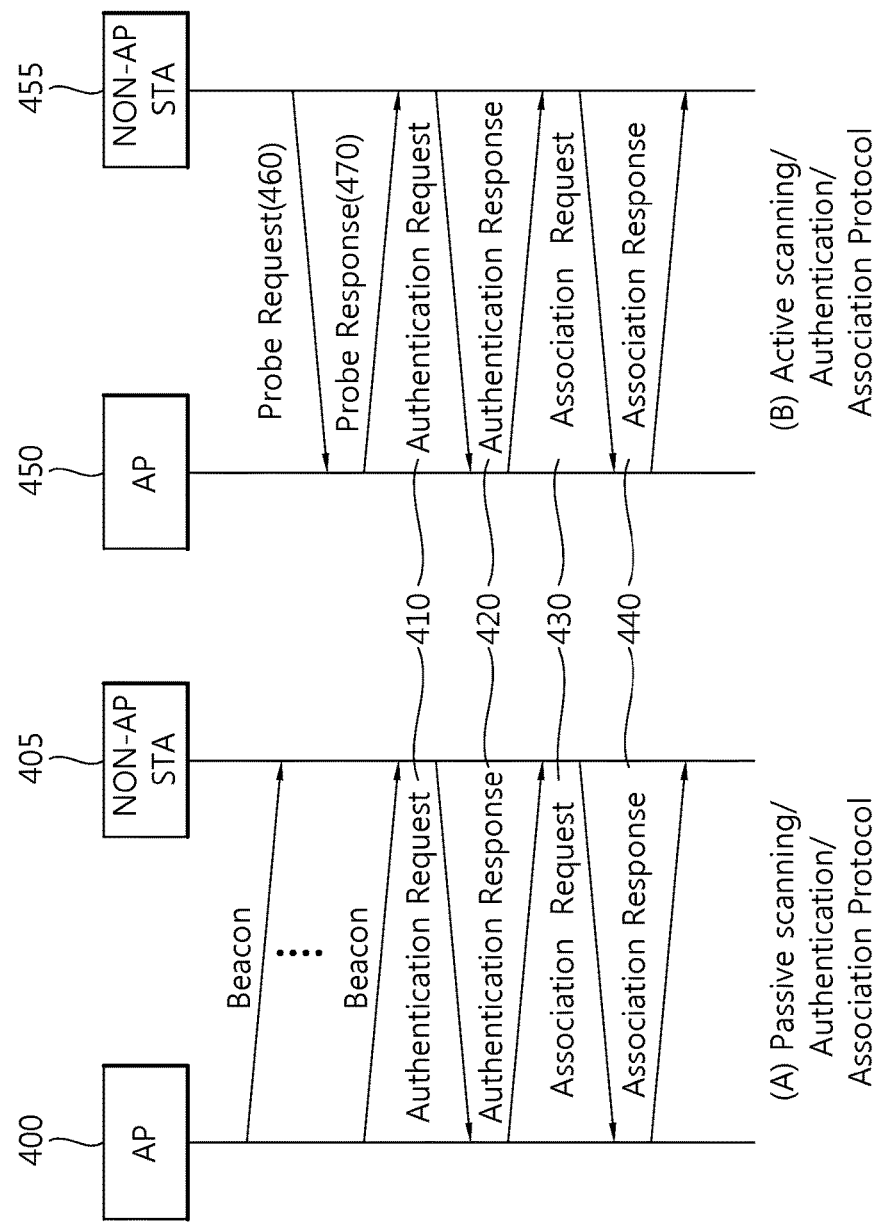
FIG. 4 is a conceptual view illustrating authentication and association processes after scanning by an AP and a STA.

FIG. 4 is a conceptual view illustrating authentication and association processes after scanning by an AP and an STA is finished.

Referring to FIG. 4, after performing passive/active scanning, authentication and association may be performed with one of scanned APs.

The authentication and association processes may be performed through 2-way handshaking, for example. (A) of FIG. 4 is a conceptual view illustrating authentication and association processes after passive scanning, and (B) of FIG. 4 is a conceptual view illustrating authentication and association processes after active scanning.

The authentication and association processes may be performed in the same manner by exchanging an authentication request frame 410, an association response frame 420, an association request frame 430, and an association response frame 440 between APs 400 and 450 and non-AP STAs 405 and 455, regardless of whether active scanning or passive scanning is employed.

The authentication process may be performed by transmitting the authentication request frame 410 by the non-AP STAs 405 and 455. In response to the authentication request frame 410, the APs 400 and 450 may transmit the authentication response frame 420 to the non-AP STAs 405 and 455. An authentication frame format is disclosed in IEEE 802.11 8.3.3.11.

The association process may be performed by transmitting the association request frame 430 by the non-AP STAs 405 and 455 to the APs 400 and 405. In response to the association request frame 430, the APs 405 and 455 may transmit the association response frame 440 to the non-AP STAs 400 and 450. The transmitted association frame 430 includes information regarding capability of the non-AP STAs 405 and 455. The APs 400 and 450 may determine whether they can support the non-AP STAs 405 and 455 on the basis of the information regarding the capability of the non-AP STAs 405 and 455. When supporting is available, the APs 400 and 450 may include whether the association request frame 440 is acceptable and a reason thereof, and capability information supportable by the APs 400 and 450 in the association response frame 440, and transmit the same to the non-AP STAs 405 and 455. An association frame format is disclosed in IEEE 802.11 8.3.3.5/8.3.3.6.

When the association process is finished, data transmission and reception may be normally performed thereafter. When the association process is not performed, the association process may be performed again on the basis of the reason why the association has not been performed, or an association process may be performed on a different AP.

Figure 5:
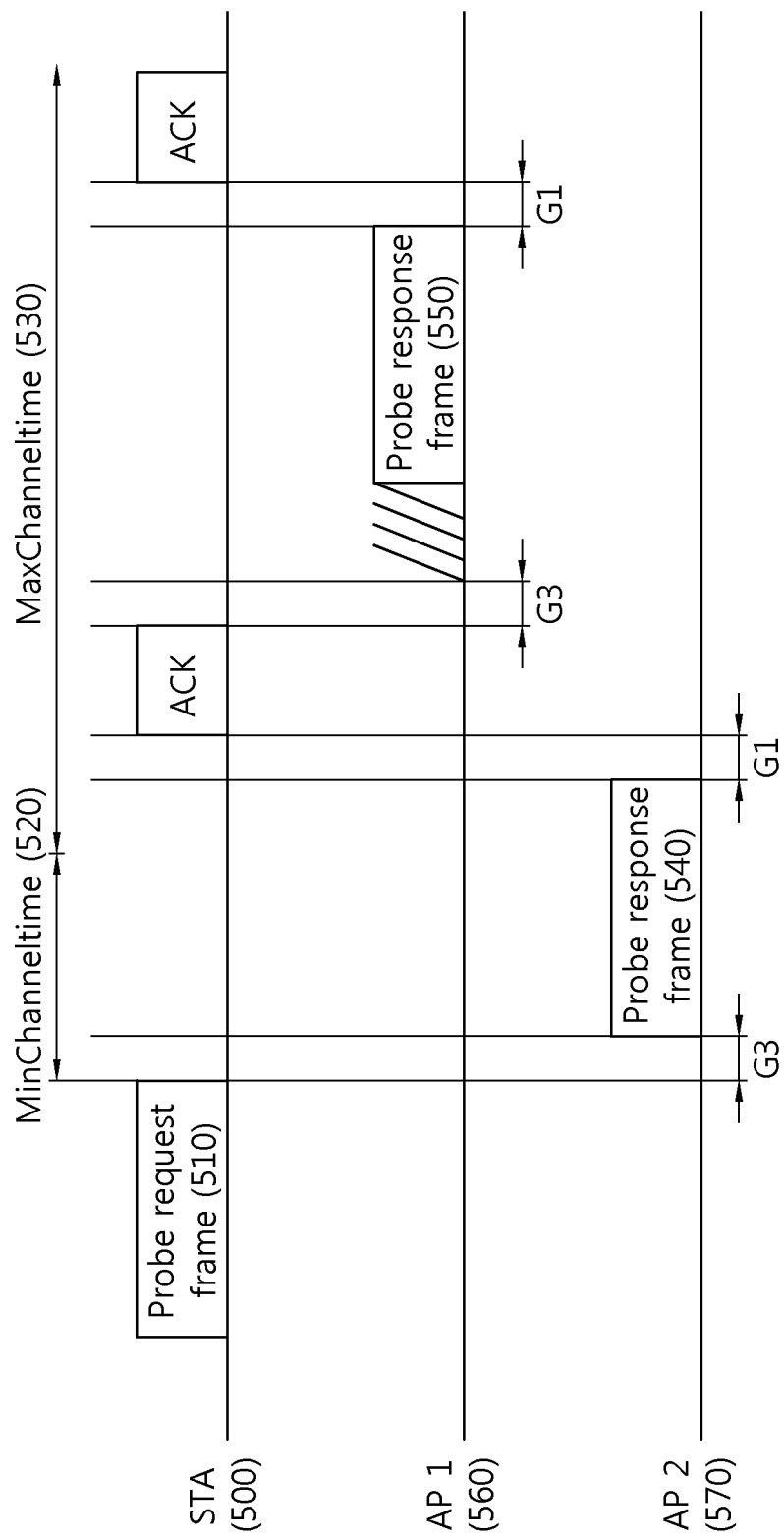
FIG. 5 is a conceptual view of an active scanning procedure.

FIG. 5 is a conceptual view of an active scanning procedure.

Referring to FIG. 5, an active scanning procedure may be performed as follows.

(1) An STA 500 determines whether it is ready to perform a scanning procedure.

The STA 500 may wait, for example, until when a probe delay time expires or when particular signaling information (e.g., PHY-RXSTART.indication primitive) is received, and perform active scanning.

The probe delay time is delay generated before the STA 500 transmits a probe request frame 510 in performing active scanning. PHY-RXSTART.indication primitive is a signal transmitted from a physical (PHY) layer to a local MAC (medium access control) layer. PHY-RXSTART.indication primitive may signal information indicating that a PPDU (PLCP protocol data unit) including a PLCP (physical layer convergence protocol) header valid in a PLCP has been received, to the MAC layer.

(2) Basic accessing is performed.

In a 802.11 MAC layer, for example, several STAs may share a wireless medium by using a distributed coordination function (DCF) as a contention-based function. The DCF may prevent collision between STAs through a back-off scheme by using carrier sense multiple access/collision avoidance (CSMA/CA) as an access protocol. The STA 500 may transmit the probe request frame 510 to APs 560 and 570 by using a basic access method.

(3) Information for specifying the APs 560 and 570 (e.g., SSID (service set identification) and BSSID (basic service set identification)) included in the MLME-SCAN.request primitive may be included in the probe request frame 510 and transmitted.

A BSSID, an identifier specifying an AP, may have a value corresponding to a MAC address of an AP. An SSID (service set identification) is a network name for specifying an AP that can be read by a person who uses an STA. A BSSID and/or an SSID may be used to specify an AP.

The STA 500 may specify an AP on the basis of information for specifying the APs 560 and 570 included in the MLME-SCAN.request primitive. The specified APs 560 and 570 may transmit the probe response frames 540 and 550 to the STA 500. The STA 500 may include SSID and BSSID information in the probe request frame 510 and transmit the same to thereby unicast, multicast, or broadcast the probe request frame 510. A method for unicasting, multicast, or broadcasting the probe request frame 510 by using SSID and BSSID information will be further described in detail with reference to FIG. 5.

For example, in a case in which an SSID list is included in MLME-SCAN.request primitive, the STA 500 may include an SSID list in the probe request frame 510 and transmit the same. The APs 560 and 570 may receive the probe request frame 510 and determine whether to transmit the probe response frames 540 and 550 to the STA 500 on the basis of an SSID included in the SSID list included in the probe request frame 510.

(4) A probe timer is initialized to 0 and operated.

The probe timer may be used to check a minimum channel time (MinChanneltime) 520 and a maximum channel time (MaxChanneltime) 530. The minimum channel time 520 and the maximum channel time 530 may be used to control an active scanning operation of the STA 500.

The minimum channel time 520 may be used for the STA 500 to perform an operation for changing a channel performing active scanning. For example, in a case in which the STA 500 fails to receive the probe response frames 540 and 550 before a probetimer reaches to the minimum channel time 520, the STA 500 may move a scanning channel to a different channel to perform scanning. When the STA 500 receives the probe response frame 540 before the probetimer reaches to minimum channel time 520, the STA 500 may wait until the maximum channel time 530 expires, and process the received probe response frames 540 and 550.

The STA 500 may search PHY-CCA.indication primitive before the probetimer reaches to during the minimum channel time 520, and determine whether different frames (e.g., probe response frames 540 and 550) have been received by the STA 500 before a probetimer reaches to the minimum channel time 520.

The PHY-CCA.indication primitive may transmit information regarding a state of a medium from a physical layer to a MAC layer. The PHY-CCA.indication primitive may inform about a state of a current channel by using a channel state parameter called busy when a channel is not available and by using a channel state parameter called idle when a channel is available. When the PHY-CCA.indication is discovered as busy, it may be determined that probe response frames 540 and 550 received by the STA 500 exist, and when PHY-CCA.indication is discovered as idle, it may be determined that probe response frames 540 and 550 received by the STA 500 do not exist.

When the PHY-CCA.indication is discovered as idle, the STA 500 may set NAV (net allocation vector) to 0 and scan a next channel. In a case in which the PHY-CCA.indication is discovered as busy, after the maximum channel time 530 expires, the STA 500 may process the probe response frames 540 and 550. After processing the received probe response frames 540 and 550, the STA 500 may set the NAV to 0 and scan a next channel.

Hereinafter, in an embodiment of the present invention, determining whether probe response frames 540 and 550 received by the STA 500 exist may include a meaning that a channel state is determined by using the PHY-CCA.indication primitive.

(5) When all the channels included in a channel list (ChannelList) are scanned, the MLME may signal a MLME-SCAN.confirm primitive. The MLME-SCAN.confirm primitive may include BSSDescriptionSet including every information obtained during the scanning process.

In a case in which the STA 500 employs an active scanning method, the STA 500 should perform monitoring to determine whether the parameter of PHY-CCA.indication is busy before a probetimer reaches to the minimum channel time.

Specific information included in the foregoing MLME-SCAN.request primitive is as follows. In order for the STA 500 to perform scanning, MLME-SCAN.request primitive may be received from the MLME. The MLME-SCAN.request primitive is a primitive generated by the SME. The MLME-SCAN.request primitive may be used to determine whether a different BSS with which the STA may be associated exists.

The MLME-SCAN.request primitive may include information such as BSSType, BSSID, SSID, ScanType, ProbeDelay, ChannelList, MinChannelTime, MaxChannelTime, RequestInformation, SSID List, ChannelUsage, AccessNetworkType, HESSID, MeshID, VendorSpecificInfo.

Details of the MLME-SCAN.request primitive may refer to 6.3.3.2 MLME-SCAN.request of IEEE Draft P802.11-REVmb™/D12, November 2011 'IEEE Standard for Information Technology Telecommunications and information exchange between systems—Local and metropolitan area networks—Specific requirements Part 11: Wireless LAN Medium Access Control (MAC) and Physical Layer (PHY) Specifications' disclosed in November 2011.

Table 1 below briefly shows information included in the MLME-SCAN.request primitive.

TABLE 1

| Name | Description |
| --- | --- |
| BSSType | Determines whether infrastructure BSS, IBSS, MBSS, or all, are included in the scan. |
| BSSID | Identifies a specific or wildcard BSSID. |
| SSID | Specifies the desired SSID or the wildcard SSID. |
| ScanType | Indicates either active or passive scanning |
| ProbeDelay | Delay (in microseconds) to be used prior to transmitting a Probe frame during active scanning. |
| ChannelList | Specifies a list of channels that are examined when scanning for a BSS. |
| MinChannelTime | The minimum time (in TU) to spend on each channel when scanning. |
| MaxChannelTime | The maximum time (in TU) to spend on each channel when scanning. |
| RequestInformation | This element is optionally present if dot11RadioMeasurementActivated is true and is placed in a Probe Request frame to request that the responding STA include the requested information in the Probe Response frame. |
| SSID List | One or more SSID elements that are optionally present when dot11MgmtOptionSSIDListActivated is true. |
| ChannelUsage | Specifies request types for the Channel Usage request. |
| AccessNetworkType | Specifies a desired specific access network type or the wildcard access network type. This field is present when dot11InterworkingServiceActivated is true. |
| HESSID | Specifies the desired specific HESSID network identifier or the wildcard network identifier. This field is present when dot11InterworkingServiceActivated is true. |
| Mesh ID | Only present if BSSType = MESH or BSSType = ANY_BSS. Specifies the desired Mesh ID or wildcard Mesh ID. |

TABLE 1-continued

| Name | Description |
| --- | --- |
| RequestParameters | The parameters define the responding STAs. |
| ReportingOption | Indicates the result reporting mode |
| APConfigurationChangeCount | When a specific BSSID is indicated in the MLME-SCAN.request, the AP ConfigurationChangeCount associated with the stored configuration of the AP is optionally provided. |
| VendorSpecificInfo | Zero or more elements. |

A request parameter included in the MLME-SCAN.request.primitive may be used to determine whether a response STA is to transmit a probe response frame. The request parameter may include information for requesting that information regarding a different BSS should be included in a probe response frame. Also, the request parameter may include a report request field, a delay reference field, and a maximum delay limit field.

The report request field may include information requesting that the information regarding a different BSS should be included in the probe response frame. The delay reference field may include information regarding a delay type applied as a response to the probe request frame, and the maximum delay limit field may include maximum access delay information regarding a delay type indicated by the delay reference field.

Besides, the request parameter may include a minimum data rate field and/or a received signal strength limit field. The minimum data rate field includes information regarding the overall lowest data rate in transmitting an MSDU or an A-MSDU. The received signal strength limit field may further include information regarding a limit value of a signal required for a receiver of the probe request frame to respond.

Figure 6:
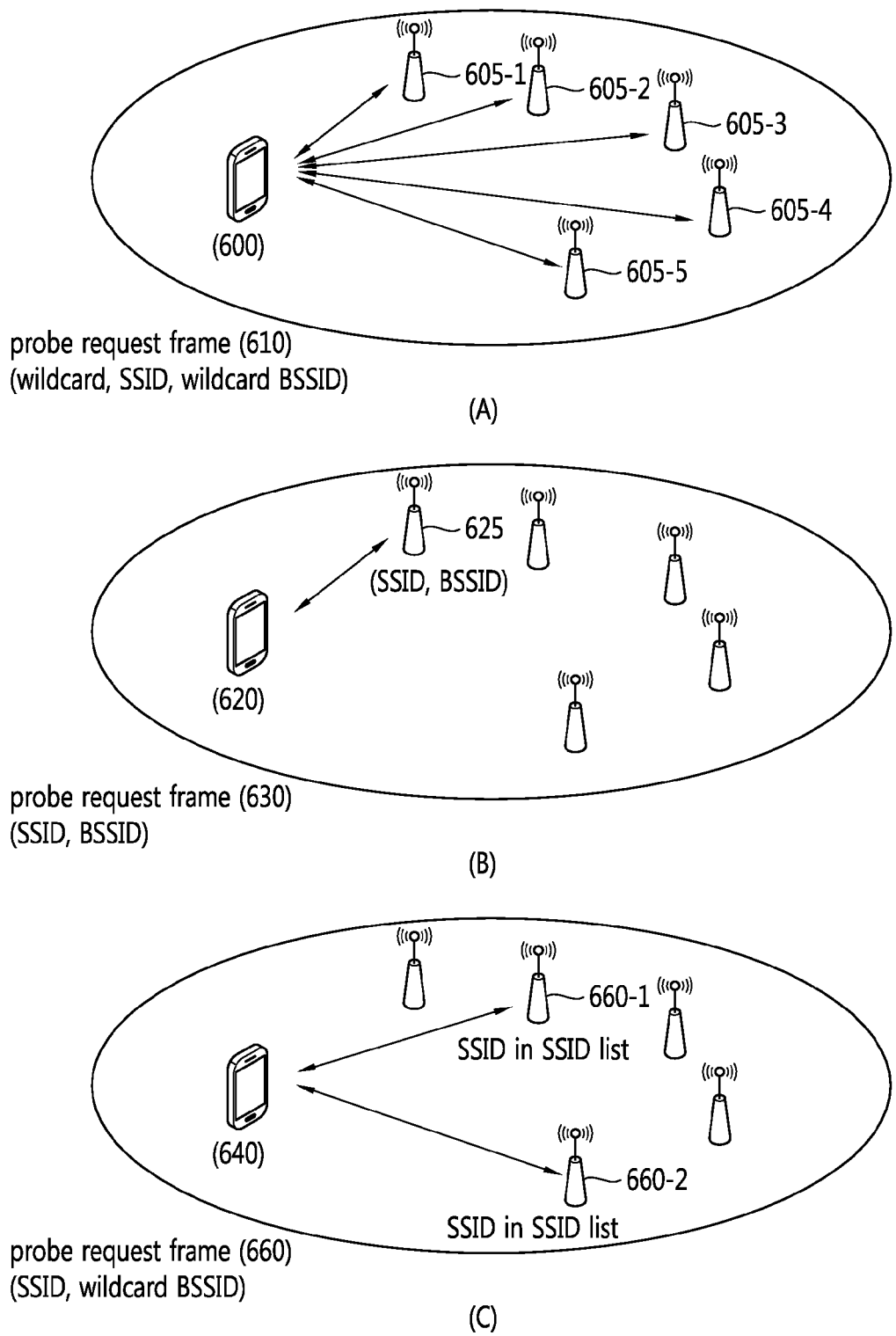
FIG. 6 is a conceptual view illustrating a method for transmitting a probe request frame.

FIG. 6 is a conceptual view illustrating a method for transmitting a probe request frame.

In FIG. 6, a method of broadcasting, multicasting, and unicasting a probe request frame by a station (STA) is illustrated.

(A) of FIG. 6 illustrates a method of broadcasting a probe request frame 610 by an STA 600.

The STA 600 may include a wildcard SSID and a wildcard BSSID in a probe request frame 610 and broadcast the probe request frame 610.

The wildcard SSID and the wildcard BSSID may be used as identifiers indicating all the APs 606-1, 606-2, 606-3, 606-4, and 606-6 included in a transmission range of the STA 600.

When the STA 600 includes the wildcard SSID and the wildcard BSSID in the probe request frame 610 and transmits the same, the APs 606-1, 606-2, 606-3, 606-4, and 606-6 may receive the probe request frame 610 transmitted from the STA 600 and transmit a probe response frame as a response with respect to the received probe request frame, to the STA 600.

Upon receiving the broadcast probe request frame 610, when the APs 606-1, 606-2, 606-3, 606-4, and 606-6 transmit the probe response frame to the STA 600 within a predetermined period of time, respectively, in response to the received probe request frame 610, the STA 600 may have a problem in that it receives and processes too many probe response frames at a time.

(B) of FIG. 6 illustrates a method of unicasting a probe request frame 630 by an STA 620.

Referring to (B) of FIG. 6, in a case in which the STA 620 unicasts the probe request frame 630, the STA 620 may transmit the probe request frame 630 including a specific SSID/BSSID of an AP. Among APs which have received the probe request frame 630, only an AP 626 corresponding to the specific SSID/BASSID may transmit a probe response frame to the STA 620.

(C) of FIG. 6 illustrates a method of multicasting a probe request frame 660 by an STA 640.

Referring to (C) of FIG. 6, the STA 640 may include an SSID list and a wildcard BSSID in a probe request frame 660 and transmit the same. Among APs which have received the probe request frame 660, APs 660-1 and 660-2 corresponding to the SSID on the SSID list included in the probe request frame may transmit a probe response frame to the STA 640, respectively.

Figure 7:
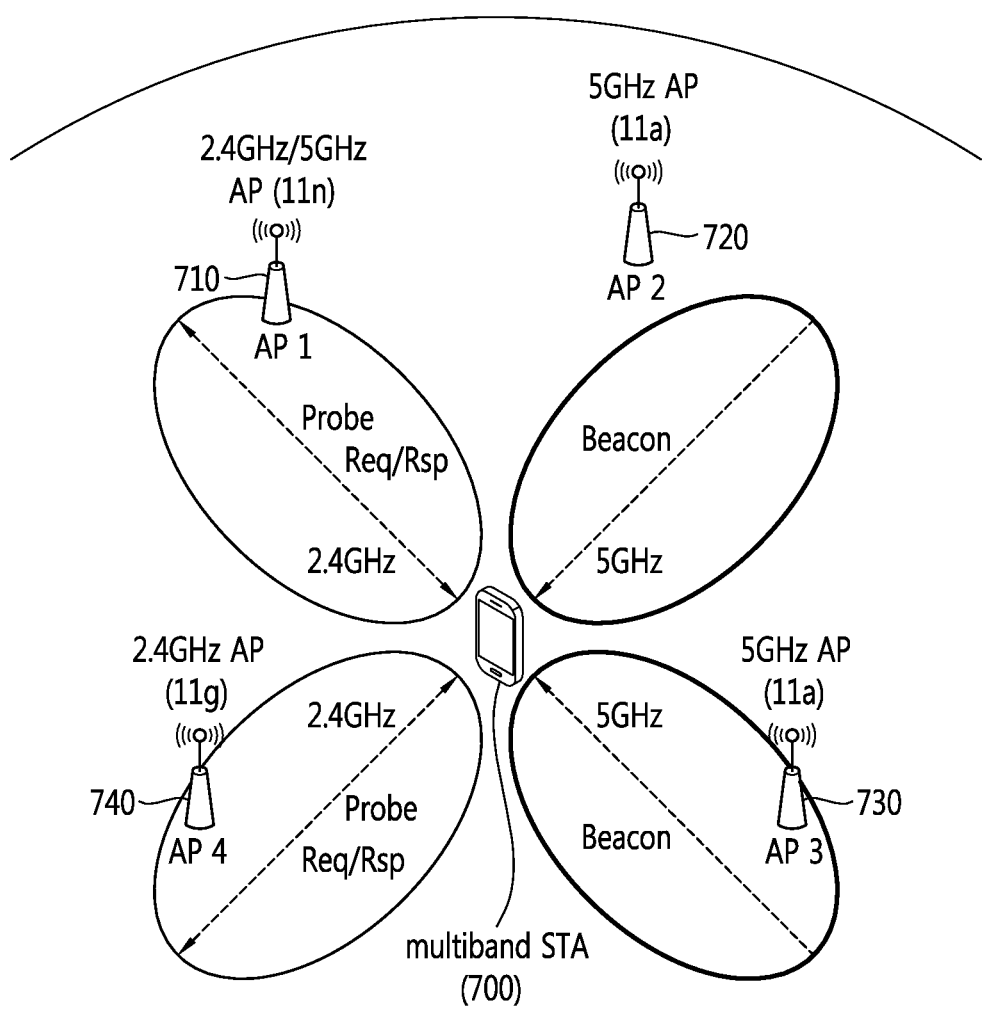
FIG. 7 is a conceptual view illustrating a method for discovering an AP by an STA supporting multi-band.

FIG. 7 is a conceptual view illustrating a method for discovering an AP by an STA supporting multiple bands.

Referring to FIG. 7, it is assumed that APs supporting a single band and multiple bands coexist around an STA 700 supporting multiple bands. A process in which an STA senses a channel to discover an AP may be performed as follows. Hereinafter, in an embodiment of the present invention, a band may indicate a reference frequency (e.g., a channel starting frequency) generating a channel, and a channel may indicate a frequency band divided to have a predetermined channel spacing on the basis of a band. For example, a plurality of channels may be defined to have a channel spacing of 40 MHz, respectively, by using a frequency of approximately 2.4 GHz as a starting frequency. Hereinafter, the 2.4 GHz may be referred to as a channel band, and a frequency band divided by 40 MHz may be referred to as a channel. Supporting multiple bands by an STA or an AP means that an STA or an AP may operate in channels defined in a plurality of bands. Supporting a single band by an STA or an AP means that an STA or an AP may operate in a channel defined in a single band.

Referring to FIG. 7, an STA 700 supporting multiple bands may scan each channel with respect to a 2.4 GHz band and a 5 GHz band to select an optimal AP and may be associated with the selected AP. The STA 700 may perform active scanning in the 2.4 GHz band channel and perform passive scanning in a 5 GHz band channel.

The STA 700 may sequentially perform scanning to discover an AP in the channels of the 2.4 GHz and 5 GHz. The STA 700 may transmit a probe request frame to a first AP 710 and a fourth AP 740 operating in the 2.4 GHz through the 2.4 GHz band. The first AP 710 and the fourth AP 740 may transmit a probe response frame, respectively, in response to the probe request frame transmitted from the STA 700.

Thereafter, the STA 700 receives beacon frames transmitted from a second AP 720 and a third AP 730 operating in the 5 GHz band, and perform passive scanning on the basis of the received beacon frames.

The STA 700 supporting multiple bands may discover target APs by scanning all the channels of the multiple bands. Hereinafter in an embodiment of the present invention, an AP, which is scanned by the STA 700 or with which the STA 700 intends to be associated, will be defined as a term of a 'target AP'. For example, a target AP may be an AP specified by information (e.g., SSID and/or BSSID information) for specifying an AP included in a MLME-SCAN.request primitive.

In the case in which the STA 700 performs scanning according to the method illustrated in FIG. 7, since the STA 700 should search channels of all the bands in performing scanning, delay may occur in performing scanning.

Hereinafter, in an embodiment of the present invention, a method of performing AP discovery faster than the related art method, in performing a scanning procedure by an STA supporting multiple bands in a WLAN environment supporting multiple bands will be described. In an embodiment of the present invention, it is assumed that each AP has information regarding an access load state of neighbor APs or information regarding as to whether each AP can accommodate an access of an STA. For example, information regarding an access load state of neighbor APs or information regarding as to whether each AP can accommodate an access of an STA may be information transmitted to each AP through an interface defined between APs or higher layer information or may be information reported from an STA.

Also, 2.4 GHz and 5 GHz mentioned in an embodiment of the present invention hereinafter are examples of different frequency bands in which an AP or an STA operate. Any other frequency band may also be included in the scope of the present invention. Also, an embodiment of the present invention may also be applied to an AP or an STA operating in different frequency bands (three or more different frequency bands) greater than two frequency bands, other than two frequency bands.

Hereinafter, the 2.4 GHz band may be defined to be used as a term of a first band, the 5 GHz band may be defined to be used as a term of a second band, an AP operating in the 2.4 GHz band may be defined to be used as a term of a first band AP, and an AP operating in the 5 GHz band may be defined to be used as a term of a second band AP.

Figure 8:
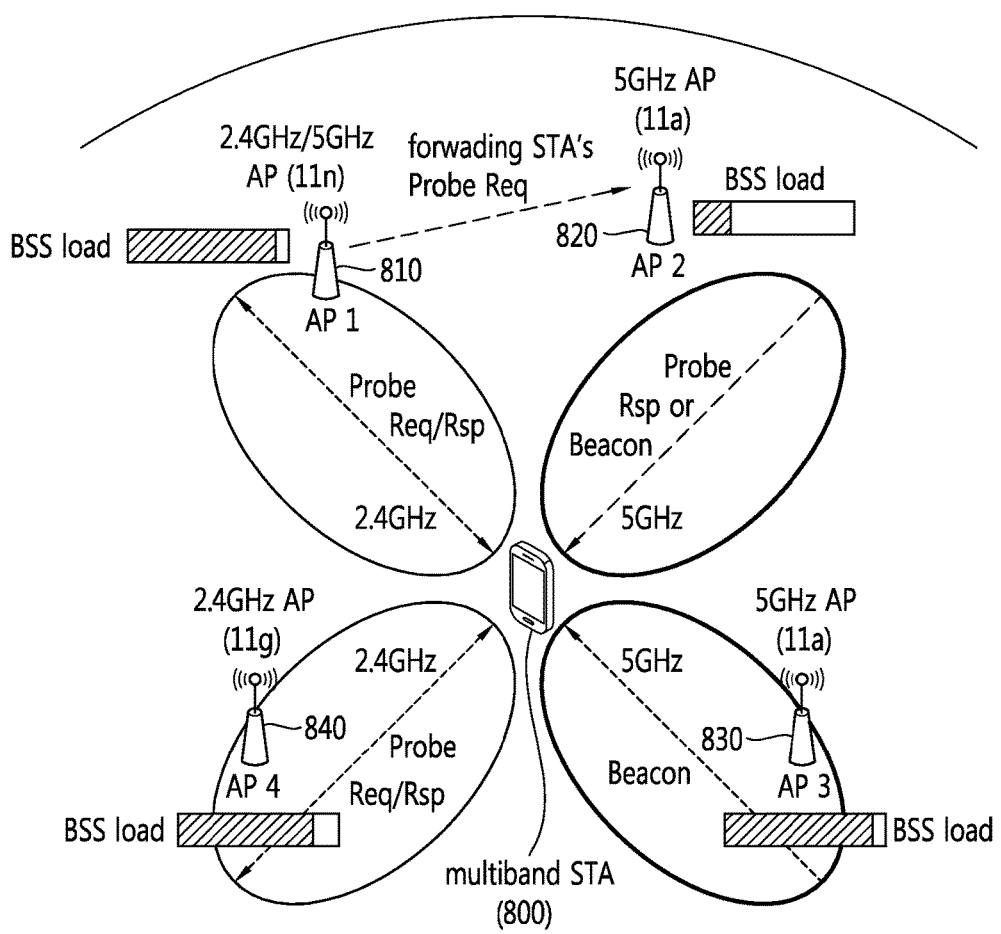
FIG. 8 is a conceptual view illustrating a method for performing scanning in a plurality of channels by an STA.

FIG. 8 is a conceptual view illustrating a method for performing scanning in a plurality of channels by an STA.

In FIG. 8, it is assumed that a first AP 810 and a fourth AP 840 are first band APs, and a second AP 820 and a third AP 830 are second band APs.

Referring to FIG. 8, an STA 800 may perform active scanning on a first band AP. The STA 800 may transmit a probe request frame to the first band AP. The first band AP (the first AP 810 or the fourth AP 840) may transmit a probe response frame as a response with respect to the probe request frame. The probe response frame transmitted by the first band AP may be a probe response frame having a format different from that of a legacy probe response frame. For example, when the first AP 810 transmits information regarding neighbor APs to induce the STA 800 to be associated with a neighbor AP, a short probe response frame obtained by subtracting a portion of information from a legacy probe response frame may be transmitted. Also, the probe response frame transmitted by the first band AP may include additional information different from the legacy probe response frame.

The probe response frame transmitted by the first band AP may include information (e.g., access load information of neighbor APs) regarding neighbor APs (i.e., different first band AP and second band AP). When the first band AP determines that it cannot accommodate an STA which has performed accessing, like a case that an access load of the first band AP cannot permit accessing of the STA, the first band AP may allow the STA to perform initial accessing to a different AP. For example, the first band AP may include information regarding an AP (e.g., an AP having an access load less than that of the first band AP) determined according to a specific standard of judgment, among neighbor APs, in a probe response frame, and transmit the same to the STA 800. Namely, the AP includes information regarding the neighbor AP in the probe response frame, so that the STA 800, which has received the probe response frame, may be switched to the different AP, not the AP which has transmitted the probe request frame, to perform a scanning procedure. The neighbor AP may be at least one of a different AP operating in the same channel as that of the first band AP that transmits the probe response frame, a different AP operating in the same band as that of the first band AP that transmits the probe response frame, and a different AP operating in a band different from that of the first band AP that transmits the probe response frame.

Hereinafter, in an embodiment of the present invention, neighbor AP information inducing the STA 800 to perform a scanning procedure with a neighbor AP will be defined and used as a term of scanning AP redirection information. The neighbor AP information used for the STA to perform a scanning procedure with a neighbor AP may be expressed by various other terms such as neighbor AP information, a reduced neighbor report element, and the like, other than the scanning redirection information, or may be expressed in various information formats. The STA 800 may determine a new target AP on the basis of the scanning AP redirection information included in the probe response frame.

Also, the first band AP may transmit information included in the received probe request frame to the neighbor AP. As illustrated in FIG. 8, the first AP 810, which has received the probe request frame from the STA 800, may transmit information regarding the probe request frame to the second AP 820. For example, when the first AP 810 cannot accommodate the STA 800 or when an access load thereof cannot permit an access of the STA 800 which has transmitted the probe request frame according to the determination result of the first AP 810, the first AP 810 may transmit information regarding the probe request frame to a neighbor AP which may be able to accommodate the STA 800 according to results of determination on the basis of an access load of the neighbor AP. Also, when the first AP 810 transmits a probe response frame to the STA 800, the first AP 810 may include information (e.g., a next beacon interval, an SSID, a BSSID, and channel information) regarding a neighbor AP, to which information regarding the probe request frame was transmitted, in the probe response frame and transmit the same to the STA 800.

The STA 800 may perform a scanning procedure with respect to a target AP determined on the basis of the information regarding a neighbor AP included in the probe response frame. For example, the STA 800 may obtain information regarding the second AP 820 from the probe response frame transmitted from the first AP 810, scan the second AP 820, determine the second AP 820 as a target AP, and perform association therewith. Alternatively, the STA 800 may obtain information regarding the second AP 820 from the probe response frame transmitted from the first AP 810, determine the second AP 820 as a target AP, and perform a scanning procedure with respect to the second AP 820. In scanning the second AP 820, both a passive scanning method or an active scanning method may be used.

By using the scanning method illustrated in FIG. 8, the STA 800 may not perform an unnecessary scanning procedure such as an operation of scanning all the multiple bands. The STA 800 may determine a target AP on the basis of the information regarding the neighbor AP included in the probe response frame and transmitted from the AP, and perform a fast scanning operation with respect to the target AP. By using such a method, delay for AP discovery can be reduced.

FIG. 8 illustrates that the first band AP transmits a response frame including scanning AP redirection information to the STA 800 on the basis of the probe request frame transmitted from the STA 800, for the description purpose, and here, the scanning AP redirection information may also be included in a beacon frame or an FILS discovery frame included in the first band AP and transmitted to the STA 800. A follow-up scanning procedure may be performed in the same manner as that of the case in which the probe response frame is transmitted. Hereinafter, in an embodiment of the present invention, a scanning frame having a meaning indicating a frame used in a scanning procedure, like a probe response frame, a beacon frame, or an FILS discovery frame maybe used.

Figure 9:
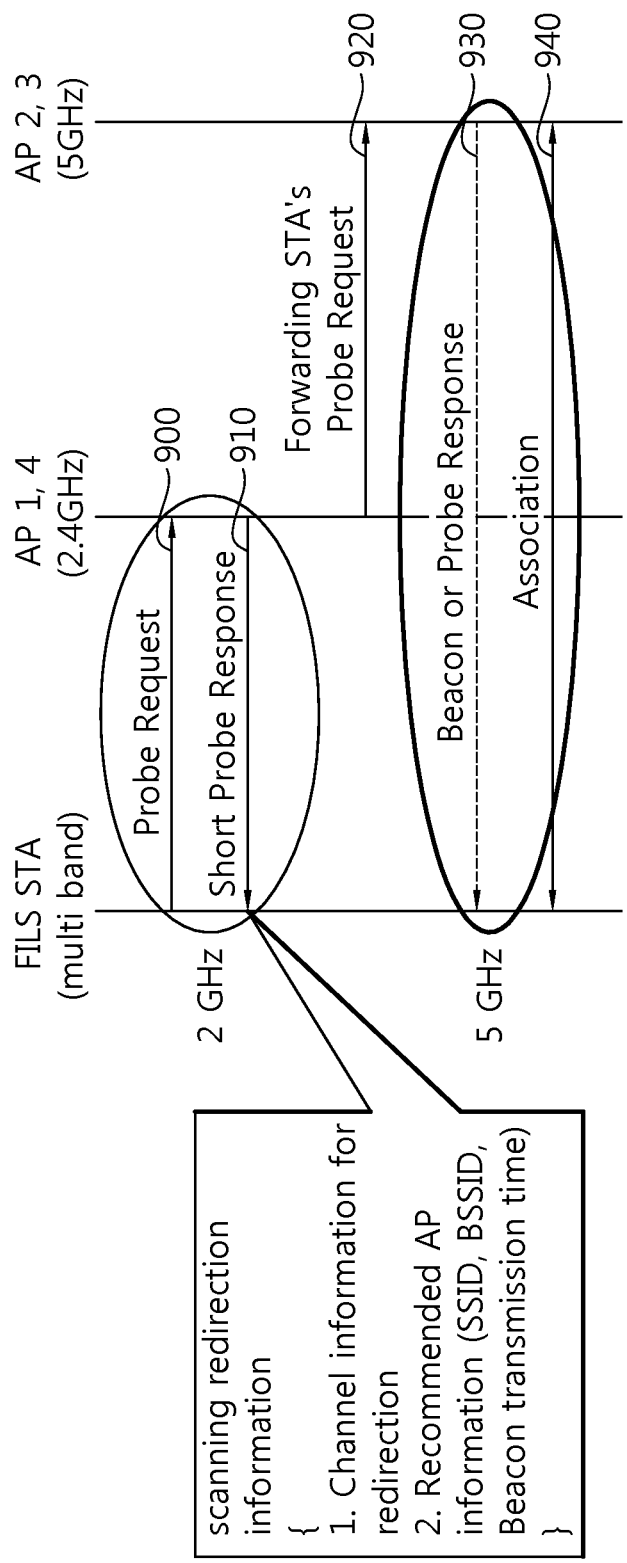
FIG. 9 is a flow chart illustrating a method for performing scanning by an STA according to an embodiment of the present invention.

FIG. 9 is a flow chart illustrating a method for performing scanning by an STA according to an embodiment of the present invention.

FIG. 9 is a flow chart of a scanning operation illustrated in FIG. 8.

An STA may perform a scanning operation on a first band AP. For example, an STA may transmit a probe request frame 900 to a first AP.

After transmitting the probe request frame 900, the STA may receive a response frame 910 with respect to the probe request frame from the first AP as a first band AP. The response frame 910 with respect to the probe request frame 900 transmitted by the first AP may additionally include scanning redirection information. The scanning redirection information may include, for example, an operating frequency band of a neighbor AP, information regarding an operating channel band, neighbor AP identification information (SSID, BSSID, or beacon transmission time information), and the like.

Also, the first AP may transmit information 920 regarding the probe request frame, which has been transmitted from the STA, to the neighbor AP. For example, the first AP may transmit identification information of the STA, configuration information of the STA, and the like, to the neighbor AP. When the neighbor AP receives the information 920 regarding the probe request frame from the first AP, the neighbor AP may transmit a probe response frame 930 to the STA even without a probe request frame from the STA.

Upon receiving the probe response frame 910 from the first AP, the STA may determine a target AP on the basis of the scanning redirection information included in the probe response frame 910, and perform scanning on a target AP. For example, the STA may receive a beacon frame 930 transmitted from the target AP or may receive a probe response frame 930 transmitted from the target AP. Here, the STA may transmit the probe request frame to the target AP and receive the probe response frame 930 in response thereto. The STA may be associated with the target AP 940 through the scanning procedure.

Table 2 below shows scanning AP redirection information included in the probe response frame, the beacon frame, or the FILS discovery frame transmitted from the first AP. The STA may perform AP discovery by scanning an AP having a different frequency band on the basis of the scanning AP redirection information as information regarding a neighbor AP included in the response frame.

TABLE 2

| Information | Note |
| --- | --- |
| Scanning band redirection | Inforamtion regarding an operational channel band to be redirected for scanning (e.g., 5 GHz or 2.4 GHz) |
| AP information | 1. → BSSID<br>2. → SSID<br>3. → Next beacon transmission time<br>4. → BSS load element<br>5. → Channel information<br>  - Number of channel<br>  - Channel index<br>  - Primary channel indication<br>  - Channel load element (STA count, Channel utilization, available admission capacity) |

The AP information may be related to a single neighbor AP and may include information regarding one or more neighbor APs. For example, the STA, which has performed scanning in 2.4 GHz, may quickly perform AP discovery in 5 GHz, a different frequency band, on the basis of the received scanning AP redirection information. For example, the STA may redirect a band in which initial accessing is to be performed on the basis of the scanning band redirection information of the received scanning response frame. Also, the STA may redirect an AP on which initial accessing is to be performed on the basis of an AP corresponding to a BSSID of AP information of a received scanning response frame. Hereinafter, a term of a field used in an embodiment of the present invention is arbitrary, which may be expressed as various terms. For example, a scanning band redirection field may be defined as a different term such as a band field. Also, each information included in AP information may be defined by each field. For example, a BSSID or an SSID may be expressed as a term of an ID field, a next beacon transmission time may be expressed as a term of a time field, and channel information may be expressed as a term of a channel field.

Figure 10:
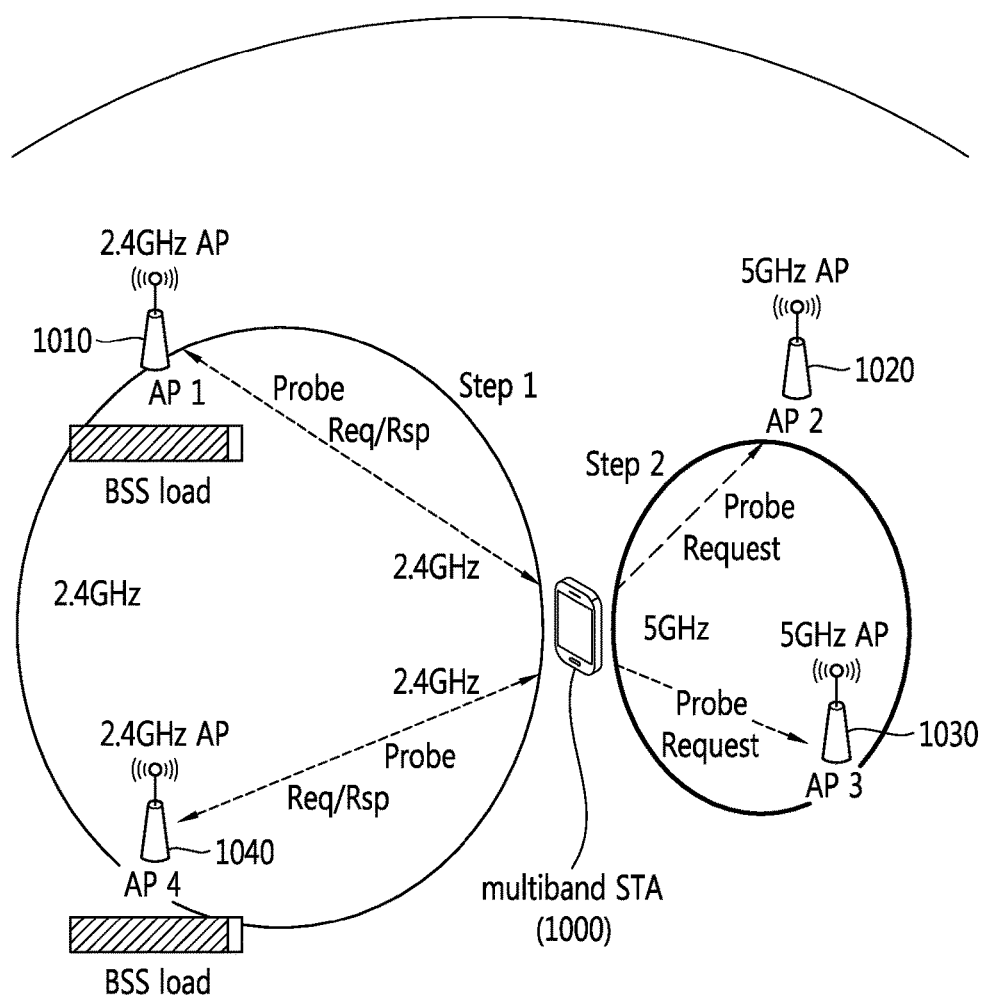
FIG. 10 is a conceptual view illustrating a scanning procedure of an STA according to an embodiment of the present invention.

FIG. 10 is a conceptual view illustrating a scanning procedure of an STA according to an embodiment of the present invention.

Referring to FIG. 10, an STA 1000 may set active scanning as default setting of a scanning method for AP discovery in a channel of a first band. The STA 1000 may transmit a probe request frame to a first band AP (e.g., a first AP 1010).

The first band AP 1010 may receive a probe request frame from the STA 1000 but it may transmit scanning redirection information allowing the STA 100 to access a different neighbor AP. For example, when it is determined that the first band AP cannot accommodate the STA 1000 due to an access load due to a different STA, the first band AP 1010 may induce the STA 1000 to access a neighbor AP. To this end, the first AP 1010 may include scanning AP redirection information in a probe response frame and transmit the same to the STA 1000. The STA 1000 may perform scanning procedure with respect to the neighbor AP on the basis of the scanning AP redirection information.

The scanning redirection information may include information regarding an indicator indicating performing of active scanning, information regarding a band in which scanning is to be performed, and information regarding a channel by which scanning is to be performed. Namely, information regarding a band of a channel, rather than a specific identifier with respect to an AP, may be included in the scanning redirection information and transmitted. The STA 1000 may perform a scanning procedure on a particular band or channel on the basis of the scanning redirection information.

FIG. 10 illustrates an operation between the first band AP 1010 and the STA 1000.

When the STA 1000 receives the scanning AP redirection information from the first band AP 1010, it may perform active scanning on second band APs 1020 and 1030. The scanning redirection information transmitted from the first band AP 1010 may include information regarding a particular band or channel. The STA 1000 may perform a scanning procedure by broadcasting a probe request frame in a second band as a band included in the scanning redirection information.

Figure 11:
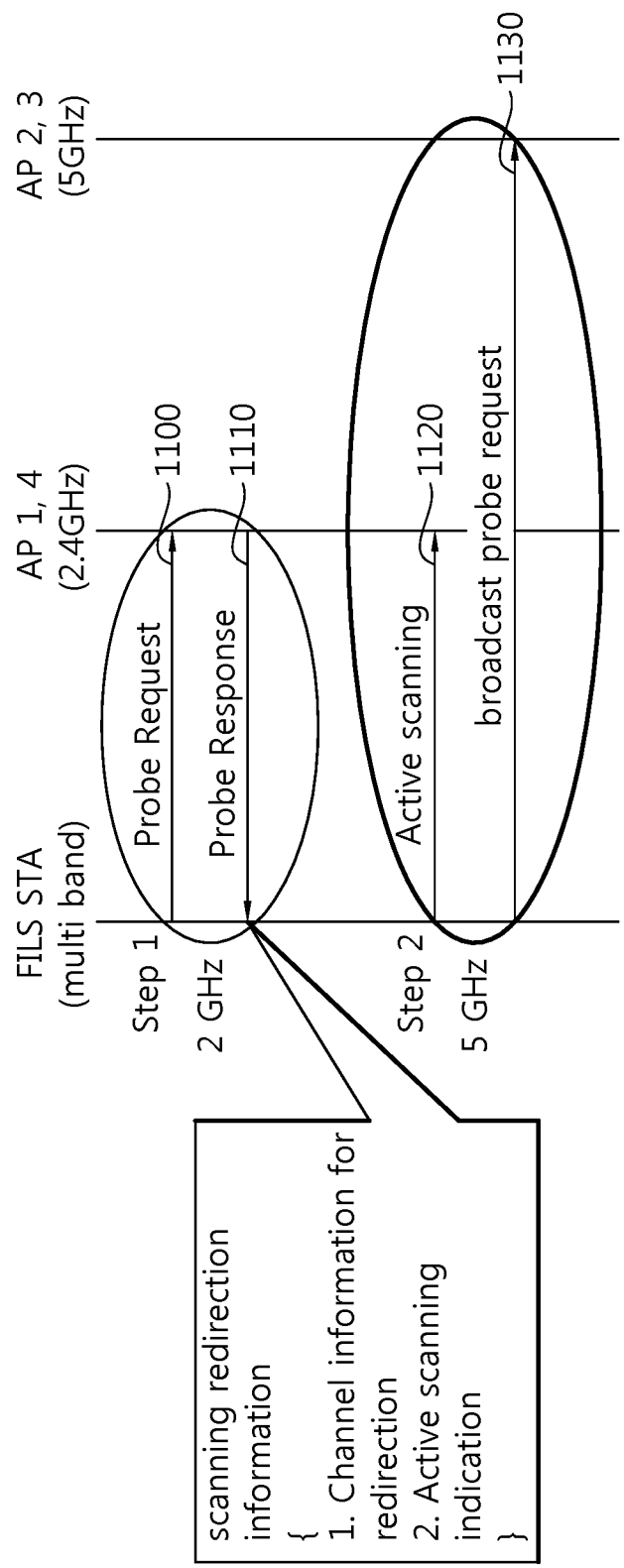
FIG. 11 is a conceptual view illustrating a scanning procedure of an STA according to an embodiment of the present invention.

FIG. 11 is a conceptual view illustrating a scanning procedure of an STA according to an embodiment of the present invention.

Referring to FIG. 11, an STA may transmit a probe request frame 1100 to a first band AP. In a case in which the STA cannot be accommodated according to determination results of a first band AP, the first band AP may transmit scanning redirection information to the STA. The scanning redirection information may be included in the probe response frame 1110 and transmitted.

The scanning redirection information may include channel information for redirection, band information for redirection, and information indicating whether to perform active scanning.

The STA may determine a band or a channel for performing the active scanning 1120 on the basis of the scanning AP redirection information. Also, the STA may determine information regarding whether to perform active scanning 1120 on the basis of AP redirection information. In a case in which the AP redirection information indicates performing of scanning with respect to a second band, the STA may perform a scanning procedure on the second band. For example, the STA may broadcast 1130 a probe request frame with respect to the second band on the basis of the scanning AP redirection information.

Table 3 shows scanning AP redirection information used in the scanning procedure of FIGS. 10 and 11. The scanning AP redirection information shown in Table 3 may be included in a scanning frame (e.g., a probe response frame, a beacon frame, or an FILS discovery frame) transmitted from the first AP. The STA may perform AP discovery by performing a scanning procedure on the basis of the scanning AP redirection information included in the scanning frame. The scanning redirection information may include only a portion of the information shown in Table 3.

TABLE 3

| Information | Note |
| --- | --- |
| Scanning band redirection | Information regarding operational channel band to be redirected for scanning (e.g., 5 GHz, 2.4 GHz) |
| Primary channel | Channel number of the primary channel |
| Secondary Channel Offset | Indicates the offset of the secondary channel relative to the primary channel. |
| STA channel width | Defines the channel widths that may be used to transmit to the STA. |
| Active scanning indication | Set to 1 when active scanning to a different band indicated in scanning band redierction is induced (or recommended).<br>When active scanning indication is set to 1, a terminal perform active scanning by broadcasting or unicasting a probe request to a channel of a band specified in scanning band rediection. |

For example, the STA may redirect a band for performing initial access on the basis of scanning band redirection information of a received scanning response frame. Also, the STA may redirect a channel for performing initial access on the basis of a channel corresponding to a channel number in primary channel information of the received scanning response frame. In case of a scanning band redirection field, it may be defined by a different term of a band field. Also, each information included in AP information may also be defined by each field.

For example, a BSSID or an SSID may be expressed as a term of an ID field, a next beacon transmission time may be expressed as a term of a time field, and channel information may be expressed as a term of a channel field.

Table 4 below shows another example of scanning AP redirection information used in the scanning procedure of FIGS. 10 and 11.

TABLE 4

| Information | Note |
| --- | --- |
| Scanning band redirection | Information regarding operational channel band redirected for scanning<br>● → Operating class (e.g., 5 GHz or 2.4 GHz)<br>● → Channel list of operatng class |
| Scanning type indication | Information for determining a scanning type when scanning to a different band indicated in scanning band redirection is induced (or recommended)<br>0: passive scanning<br>1: active scanning |

As shown in Table 4, the scanning redirection information may include only redirection information regarding a scanning band and information regarding a scanning type. An operating class may be an index according to classification of information (e.g., a channel starting frequency, channel spacing, a channel set, and the like) regarding a frequency band in which an STA or an AP operates. Also, according to an embodiment of the present invention, in order for an STA supporting multiple bands (e.g., 2.4 GHz and 5 GHz) to scan an AP, the following method may be used. An AP may include information regarding a second band in a scanning frame on the basis of a probe request frame received in a first band and transmit the same to an STA. The scanning redirection information may be included in an existing information element of a scanning frame or may be transmitted through a newly defined information element.

Namely, the STA may perform active scanning by transmitting a probe request frame in a second band on the basis of information regarding the second band included in the scanning frame.

Figure 12:
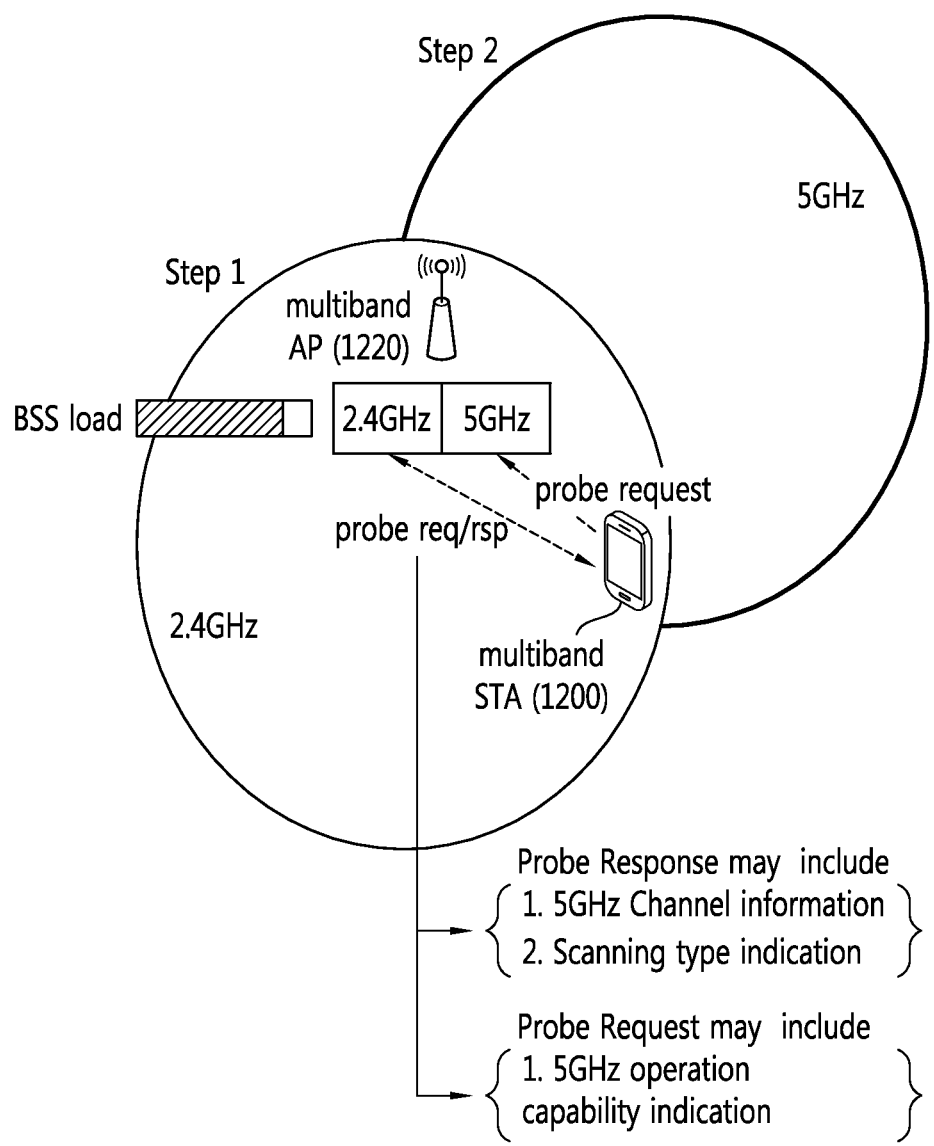
FIG. 12 is a conceptual view illustrating a scanning procedure of an STA according to an embodiment of the present invention.

FIG. 12 is a conceptual view illustrating a scanning procedure of an STA according to an embodiment of the present invention.

In FIG. 12, a case in which an STA 1200 supporting multiple bands performs a scanning procedure with an AP 1220 supporting multiple bands is illustrated.

The STA 1200 may transmit a probe request frame to an AP 1220 through one of multiple bands. The probe request frame transmitted by the STA 1200 may include information regarding a band supported by the STA 1200. For example, the information regarding a band supported by the STA 1200 may be included in a probe request frame by a field called capability information. The capability information may indicate information regarding a band supported by the STA 1200 on the basis of various information formats. For example, the fact that an STA supports first and second bands on the basis of a multiband capability indication bitmap can be indicated.

The AP 1220 supporting multiple bands may determine whether to accommodate the STA 1200 in a first band. For example, in a case in which the AP 1220 determines that it cannot afford to accommodate an access of the additional STA in the first band on the basis of BSS load information of the first band, the AP 1220 may transmit a probe response frame including scanning redirection information to the STA 1200 though the first band.

The scanning redirection information included in the probe response frame may include information regarding a different band. The information regarding a different band may include an operating class and channel list information according to a band. Also, the scanning redirection information may include information indicating a scanning type. When the scanning type indication information is 0, it may indicate passive scanning, and when the scanning type indication information is 1, it may indicate active scanning.

The STA 1200 may obtain information regarding frequency information of the second band and/or scanning type through the probe response frame transmitted through the first band from the multiband AP 1220. The STA 1200 may perform a scanning procedure with respect to the second band on the basis of the received scanning redirection information. The second band AP may be an AP of the second band, other than the multiband AP. The second band AP may be an AP which is the same as the first band AP, i.e., an AP existing in the physically same location.

In order to guarantee fast AP discovery when the STA 1200 scans the second band AP, the STA 1200 may transmit a probe request frame in the second band so as to be associated with the second band AP. In order for the STA 1200 to perform active scanning in the second band, scanning type indication information of a probe response frame transmitted in the first band may be set to 1. Even without scanning type indication information, the STA 1200 may perform active scanning with respect to the second band.

When channel information of the adjacent second band AP is transmitted from the first band AP, it may be determined that a WLAN (ESS) including the adjacent second band AP has been established. Thus, the STA 1200 may perform active scanning on the second band AP.

Figure 13:
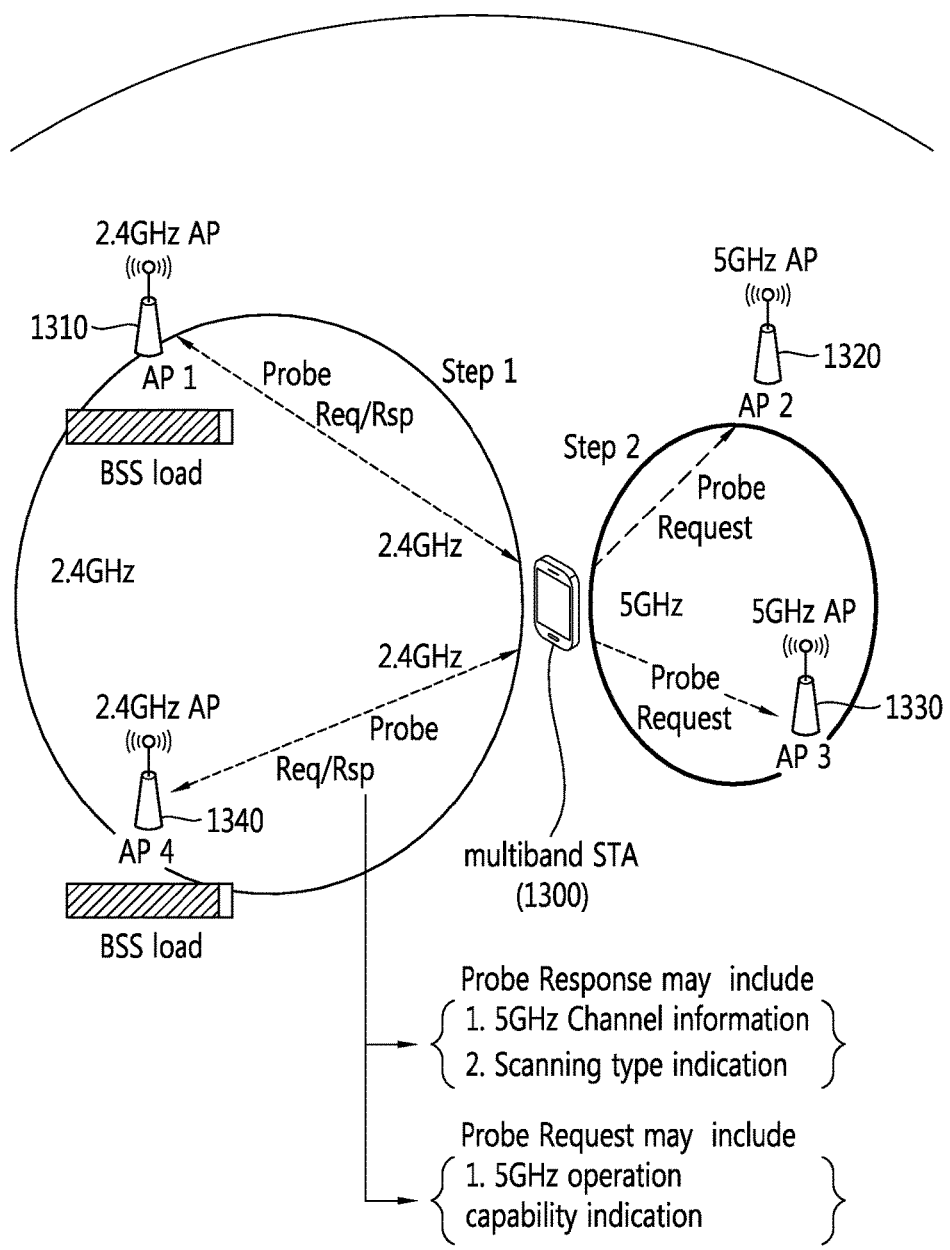
FIG. 13 is a conceptual view illustrating a scanning procedure of an STA according to an embodiment of the present invention.

FIG. 13 is a conceptual view illustrating a scanning procedure of an STA according to an embodiment of the present invention.

In FIG. 13, a case in which an STA 1300 supporting multiple bands transmits a probe request frame to an AP supporting a single band is illustrated. When the AP is a single-band AP 1310, 1320, 1330, or 1340, the same scanning procedure may be performed.

A probe request frame transmitted by the STA 1300 may include information regarding a band supported by the STA 1300. For example, the probe request frame may include capability information as information regarding a band supported by the STA 1300. Availability information may indicate that the STA supports first and second bands on the basis of multiband capability indication bitmap.

The first band APs 1310 and 1340 supporting a single band may determine whether to accommodate the STA 1300 in the first band. For example, when the APs 1310 and 1340 determine that they cannot afford to accommodate an access of an additional STA in the first band, the APs 1310 and 1340 may transmit a probe response frame including scanning redirection information to the STA 1300 through the first band.

The scanning redirection information included in the probe response frame may include information regarding a different band. The information regarding a different band may include an operating class and channel list information according to a band. Also, the scanning redirection information may include information indicating a scanning type. When the scanning type indication information is 0, it may indicate passive scanning, and when the scanning type indication information is 1, it may indicate active scanning.

The STA 1300, which has received the channel information regarding the second band included in the scanning AP redirection information and the indication of a scanning type included in the probe response frame, may scan the second band to discover the second band APs 1320 and 1330 to determine a target AP, and may be subsequently associated with the second band AP.

In order to guarantee fast AP discovery when the STA 1300 scans the second band APs 1320 and 1330, the STA 1300 may transmit a probe request frame in the second band so as to be associated with the second band APs 1320 and 1330. In order for the STA 1300 to perform active scanning in the second band, scanning type indication information of a probe response frame transmitted in the first band may be set to 1. Even without scanning type indication information, the STA 1300 may perform active scanning with respect to the second band.

When channel information of the adjacent second band APs 1320 and 1330 is transmitted from the first band APs 1310 and 1340, it may be determined that a WLAN (ESS) including the adjacent second band AP has been established. Thus, the STA 1300 may perform active scanning on the second band APs 1320 and 1330.

Hereinafter, in an embodiment of the present invention, various scanning redirection information formats are described. The scanning redirection information may be implemented in various forms and implemented to have various types of information.

According to an embodiment of the present invention, when an AP determines that it cannot afford to accommodate an STA in a current channel or in a current band, the AP may include scanning AP redirection information in various formats in a scanning frame and transmit the same.

Figure 14:
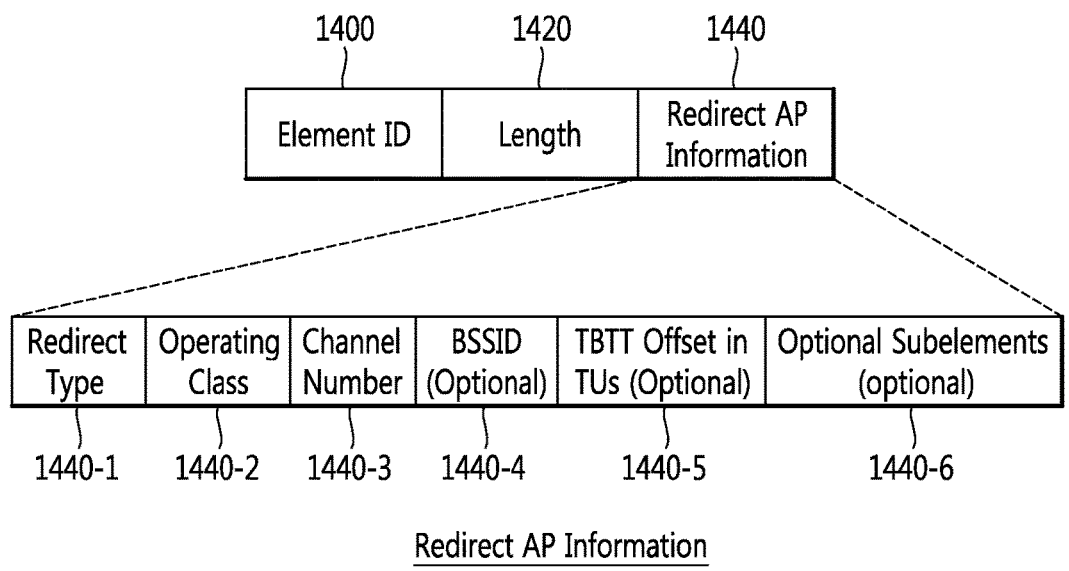
FIG. 14 is a conceptual view illustrating scanning AP redirection information according to an embodiment of the present invention.

FIG. 14 is a conceptual view illustrating scanning AP redirection information according to an embodiment of the present invention.

Referring to FIG. 14, scanning AP redirection information may include an element ID 1400, a length 1420, redirect AP information 1440. The element ID 1400 may include identification information identifying included information, and the length 142 may include information regarding a length of included information.

The scanning AP redirection information may include redirect AP information 1440. The redirect AP information 1440 may include redirect type 1440-1, an operating class 1440-2, a channel number 1440-3, a BSSID (optional) 1440-4, a TBTT offset in TUs 1440-5, an optional subelement (optional) 1440-1.

The redirect type 1440-1 may be a field having a length of 1 octet, and include information regarding a redirect type. Table 6 below shows information regarding a redirect type.

TABLE 6

| Redirect Type | Value |
| --- | --- |
| Channel Redirection | 0 |
| Band Redirection | 1 |
| Reserved | 2-255 |

Referring to Table 6, when the redirect type 1440-1 is a channel redirect, a BSSID of a neighbor AP operating in a different channel may be included in the redirect AP information. When the redirect type 1440-1 is a channel redirect, the STA may redirect a scanning channel from a current channel to a different channel on the basis of the BSSID included in the redirect AP information.

When the redirect type 1440-1 is a band redirect, the AP may redirect a scanning band of the STA to a different band. Here, in a case in which one AP is physically collocated to multiple bands (e.g., 2.4 GHz and 5 GHz), an operating class and a channel number are included in redirect AP information and transmitted, whereby the STA can be redirected to a different band of the same AP.

When the redirect type 1440-1 is a band redirect, a BSSID may not be included in the redirect AP information. Also, according to another embodiment of the present invention, an AP may redirect a scan channel of the AP by specifying a different AP of a different band. In such a case, even when the redirect type 1440-1 is a band redirect, a BSSID may be included in the redirect AP information. The redirect type may also be expressed as a term of a type field.

The operating class 1440-2 may indicate frequency information (e.g., a band of an operating channel, a band width, and the like) of an AP with which the STA is to be newly associated. When the redirect type 1440-1 is a band redirect, if the BSSID 1440-4 is not included in the redirect AP information field 1440, an AP may be searched in a corresponding band and channel on the basis of the operating class 1440-2 and the channel number information 1440-3. The operating class may be expressed as a term of a band field.

The channel number 1440-3 may include an operating channel number of an AP with which the STA may be newly associated through redirection. In a case in which the redirect type 1440-1 is a band redirect, if the BSSID 1440-4 is not included in the redirect AP information field 1440, an AP may be discovered on the basis of the operating class 1440-2 and the channel number information 1440-3. Here, the channel number may be expressed as a term of a channel field.

The BSSID 1440-3 may include an identifier of a BSS (or an identifier of an AP). The TBTT offset 1440-5 may include information regarding a time difference between a beacon transmission time of a current AP that transmits redirect AP information and that of an AP indicated in the redirect AP information. The STA may obtain timing information to receive a beacon frame transmitted by the AP indicated in the redirect AP information 1440 on the basis of the TBTT offset 1440-5. The TBTT offset 1440-5 may exist only when the BSSID is included in the redirect AP information 1440. The BSSID may also be expressed as a term of an ID field.

The optional subelement 1440-5 may include 0 or more of subelements, and each subelement may include a subelement identifier field having 1 octet, a subelement length field having 1 octet, and a data field having several lengths. The optional subelement 1440-6 may be used for the AP to transmit additional information to the STA.

The AP redirect information used as scanning redirect information may have a different format.

Figure 15:
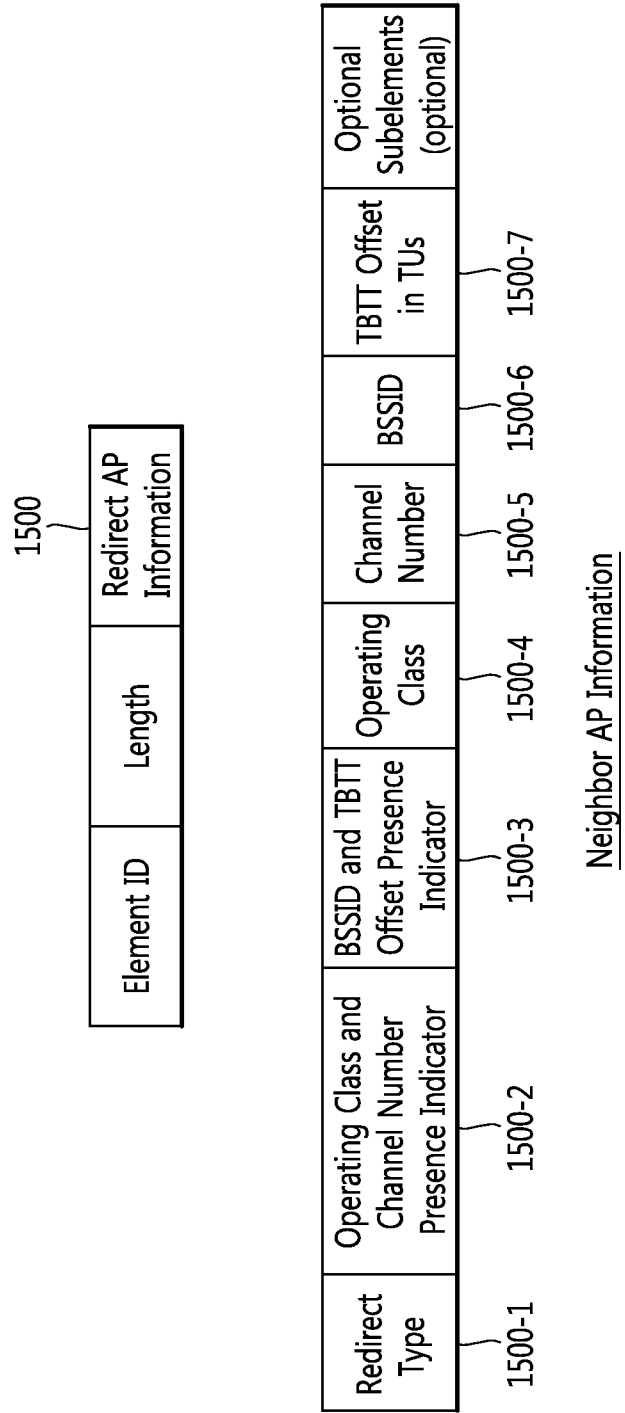
FIG. 15 is a conceptual view illustrating scanning redirection information according to an embodiment of the present invention.

FIG. 15 is a conceptual view illustrating scanning redirection information according to an embodiment of the present invention.

Referring to FIG. 15, the scanning redirection information (1500) may include neighbor AP information.

Element ID may include an identifier to identify the scanning redirection information and Length may include information on the length of the neighbor AP information.

The neighbor AP information may additionally include an operating class and channel umber presence indicator 1550-2 and a BSSID and TBTT offset presence indicator 1500-3.

The operating class and channel umber presence indicator 1550-2 may indicate whether the operating class 1500-4 and the channel number field 1500-5 exist in neighbor AP information.

The BSSID and TBTT offset presence indicator 1500-3 may indicate whether the BSSID 1500-6 and the TBTT offset field 1500-7 exist in the neighbor AP information.

Also, according to an embodiment of the present invention, information included in the redirect type may be expressed to indicate different types as follows. Table 7 shows information regarding the redirect type.

TABLE 7

| Redirect Type | Value |
| --- | --- |
| AP Redirect | 00 |
| Band Redirect | 01 |
| Informative | 10 |
| (Reserved) | 11 |

When the redirect type 1500-1 is an AP redirect, the neighbor AP information may include specific AP information. When the redirect type 1500-1 is an AP redirect, the AP may include information regarding a BSSID of a neighbor AP and channel information in the neighbor AP information. When the redirect type 1500-1 is an AP redirect, the STA may perform a scanning procedure on the AP indicated by the neighbor AP information 1500.

When the redirect type 1500-1 is a band redirect, the AP may include information regarding a different band in the neighbor AP information. When the redirect type 1500-1 is a band redirect, the STA may redirect a band from a current band to a different band on the basis of different band information and perform scanning.

When the redirect type 1500-1 is informative, the AP may provide information assisting the STA in discovering an AP. When the redirection type 1500-1 is informative, information regarding a different BSS and/or different band may be transmitted to the STA. The redirect type may also be expressed as a term of a type field.

FIG. 16 is a conceptual view illustrating scanning AP redirection information according to an embodiment of the present invention.

The operating class and channel number presence indicator 1500-2 expressed as a single information unit in FIG. 15 may be divided to be expressed as a BSSID presence indicator 1620 and a TBTT information presence indicator 1640.

In the case of using this method, whether to decode BSSID, TBTT offset information, and the like, in the neighbor AP information may be determined on the basis of the BSSID presence indicator 1620 and the TBTT information presence indicator 1640.

FIG. 17 is a conceptual view illustrating scanning AP redirection information according to an embodiment of the present invention.

Referring to FIG. 17, scanning redirect AP information may be transmitted on the basis of a reduced neighbor report element. The reduced neighbor report element is an information element used to transmit information regarding a different AP.

Referring to FIG. 17, Element ID may include an identifier to identify the scanning redirection information and Length may include information on the sum of lengths of the neighbor AP information 1720.

The reduced neighbor report element may include information regarding a reduced neighbor report type 1700.

The information regarding the reduced neighbor report type 1700 may include information regarding a type of a neighbor report element reduced to have a length of 1 octet, for example.

Types as shown Table 8 may exist as the type of the reduced neighbor report element.

TABLE 8

| Reduced Neighbor Report Type | Value |
| --- | --- |
| Redirect | 0 |
| Informative | 1 |
| Reserved | 2~7 |

When the reduced neighbor report type 1700 is a redirect, the AP may indicate information regarding a channel of the reduced neighbor report element and an identifier (e.g., a BSS0 of a neighbor AP. When the received reduced neighbor report type 1700 is a redirect, the STA may redirect a scanning channel, a scanning band, or a scanning AP of the STA on the basis of channel, band, or BSSID information included in the reduced neighbor report element.

When the reduced neighbor report type 1700 is informative, the AP may transmit the reduced neighbor report element including neighbor AP information assisting the STA to discover an AP, to the STA.

For example, when the AP determines that it cannot accommodate the STA, the AP may set the reduced neighbor report element included in the scanning frame, as redirect, and transmit the same.

Figure 18:
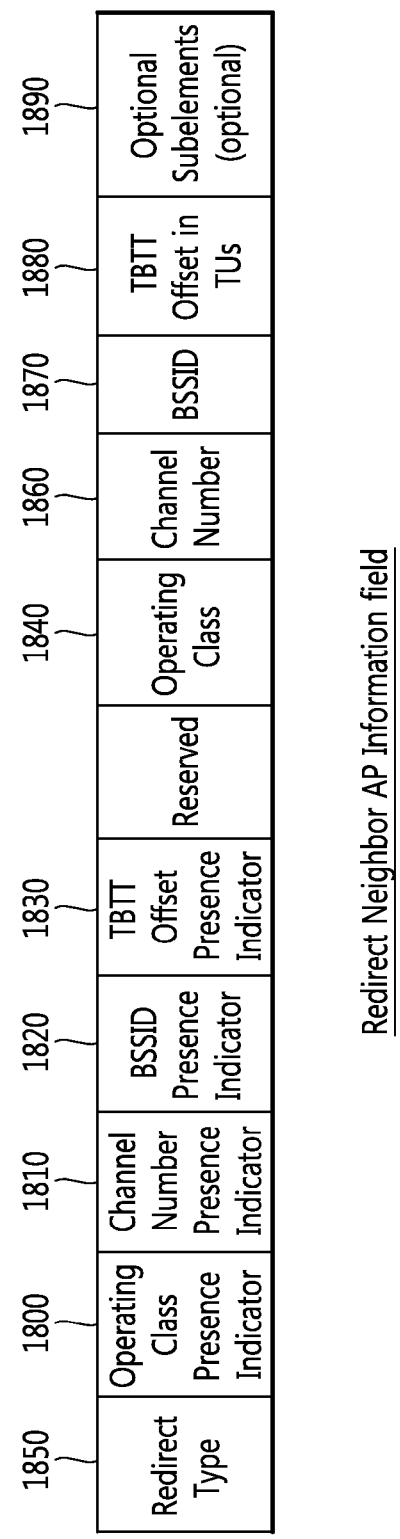
FIG. 18 is a conceptual view illustrating redirect neighbor AP information according to an embodiment of the present invention.

The reduced neighbor report element may include one or more of the redirect neighbor AP information as illustrated in FIG. 18 in the neighbor AP information 1720, for example. When the AP determines that it cannot accommodate the STA, the AP may include the redirect neighbor AP information 1720 in the reduced neighbor report element of a probe response frame, a beacon frame, of an FILS discovery frame, and transmit the same.

FIG. 18 is a conceptual view illustrating redirect neighbor AP information according to an embodiment of the present invention.

Referring to FIG. 18, a redirect type 1850 included in the redirect neighbor AP information may indicate whether redirect is an AP redirect or a band redirect.

When the redirect type 1850 is an AP redirect, the AP may indicate information regarding a BSS and a channel of a neighbor AP included in the redirect neighbor AP information to thereby redirect the STA to a different BSS.

When the redirect type 1850 is a band redirect, the AP may include different band information in the redirect neighbor AP information to thereby redirect the STA from a current band to a different band. The redirect type may also be expressed as a term of a type field.

Also, the redirect neighbor AP information may include an operating class presence indicator, a channel number presence indicator, a BSSID presence indicator, and a TBTT offset presence indicator.

The operating class presence indicator 1800 may indicate whether an operating class field exists in a redirect neighbor AP. For example, when the operating class presence indicator 1800 is 1, it may indicate that an operating class exists in the redirect neighbor AP.

The channel number presence indicator 1810 may be used to indicate whether a channel number field exists in the redirect neighbor AP. For example, when the channel number presence indicator 1810 is 1, it may indicate that a channel number field exists in the redirect neighbor AP.

The BSSID presence indicator 1820 may be used to indicate presence of a BSSID in the redirect neighbor AP. For example, when the BSSID presence indicator 1820 is 1, it may indicate that a BSSID field included in the redirect neighbor AP exists.

The TBTT offset presence indicator 1830 may indicate presence of a TBTT offset by TU. For example, when the TBTT offset presence indicator 1830 is 1, it may indicate that a TBTT offset included in the redirect neighbor AP exists.

Information included in the redirect neighbor AP may be indicated through the operating class presence indicator 1800, the channel number presence indicator 1810, the BSSID presence indicator 1820, and the TBTT offset presence indicator 1830.

The operating class 1840 may be included in the redirect AP information only when the operating class indicator and the channel number presence indicator are 1. The operating class may also be expressed as a term of a band field.

The channel number 1860 may be included in the redirect AP information only when the operating class indicator and the channel number presence indicator are 1. The channel number may be expressed as a term of a channel field.

The BSSID 1870 may be included in the redirect AP information only when the BSSID presence indicator and the TBTT offset presence indicator are 1. The BSSID may be expressed as a term of an ID field.

The TBTT offset 1880 may exist only when the BSSID presence indicator and the TBTT offset presence indicator are 1. The BSSID may be expressed as a term of a time field.

The optional subelement 1890 may include 0 or more subelement, and each subelement may include a subelement identifier field having 1 octet, a subelement length field having 1 octet, and a data field having several lengths.

When the AP determines that it cannot accommodate the STA, the AP may set such that the redirect type 1850 of the redirect neighbor AP information indicates 0 or 1 in the reduced neighbor report element of a scanning frame (a probe response frame, a beacon frame, or an FILS discovery frame), and transmit the scanning frame.

Figure 19:
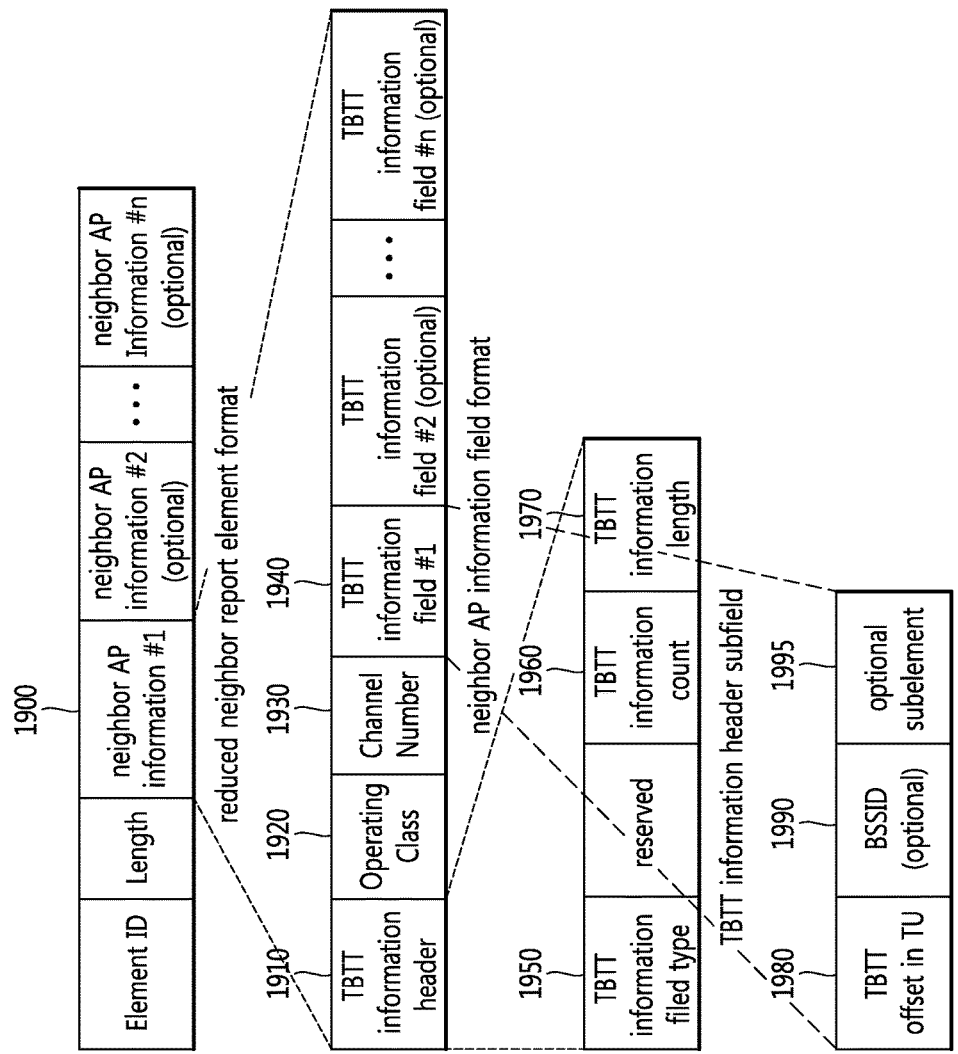
FIG. 19 is a conceptual view illustrating a reduced neighbor report element according to an embodiment of the present invention.

The reduced neighbor report element may have a different format. FIG. 19 illustrates a different format of the reduced neighbor report element.

FIG. 19 is a conceptual view illustrating a reduced neighbor report element according to an embodiment of the present invention.

Referring to FIG. 19, the reduced neighbor report element may include a channel related to a neighbor AP and various types of information regarding a neighbor AP.

Element ID may include an identifier to identify the scanning redirection information and Length may include information on the sum of lengths of the neighbor AP information 1900.

A neighbor AP information field 1900 may embody TBTT related to a group of a neighbor AP and various types of information in a single channel. Multiple neighbor AP information field 1900 may be included in the reduced neighbor report element. Multiple neighbor AP information field with same operating class and channel number values may be present in a Reduced Neighbor Report element.

The neighbor AP information field 1900 may include a TBTT information header 1910, an operating class 1920, a channel number 1930, and a TBTT information field 1940, for example.

A format of the TBTT information header 1940 may include a TBTT information field type 1950, a TBTT information count 1960, and a TBTT information length 1970.

The TBTT information field type 1950 may define a structure of a TBTT information field by a length of 2 bits. When the TBTT information field type 1950 is 0, it may indicate presence of informative neighbor AP information. The informative neighbor AP information may be information assisting the STA to perform AP discovery. When the TBTT information field type 1950 is 1, it may indicate presence of the redirect neighbor AP information (or neighbor AP). The redirect neighbor AP information (or a neighbor AP) may be used by the STA to switch an AP that performs a scanning procedure to a different AP. When the TBTT information field type 1950 is 1 and a channel and a band of an AP that has transmitted the reduced neighbor report element is a current operating channel and a current operating band, a different AP may be used by the STA to switch an AP to a different AP of the current operating channel, an AP of a channel from the current operating channel, or a different AP of a band different from the current operating band. In short, the value 1 of the TBTT information field type 1950 can be used by the STA to switch to the channel, the band, or the neighbor AP as specified in the neighbor AP information field.

The TBTT information field type may also be expressed as a term of a type field. The TBTT information count 1960 may have a length of 4 bits, and may include information regarding the number of TBTT information fields 1940 included in the AP information field. When the TBTT information count 1960 is 0, it may indicate that the TBTT information field 1940 does not exist in the neighbor AP information field. When the TBTT information field type 1950 is not 0, the TBTT information count may not be 0. For another example, the value of the TBTT information field type may be non-zero.

The TBTT information length 170 may have a length of 1 octet. The TBTT information length 1970 may include length information of an octet unit of the TBTT information field 1940 included in the neighbor AP information field. According to an embodiment of the present invention, an STA may redirect an AT on the basis of the TBTT information field 1940. The TBTT information length may also be expressed as a term of a length field.

For example, the TBTT information field type 1950 of a scanning frame received by the STA may be set to 1 and the TBTT information length 1970 may be set to a value not 0. When the TBTT information length 1970 is a value not 0, it may indicate that information for specifying an AP is included in the TBTT information field 1940 and transmitted to the STA. Namely, when the TBTT information field type 1950 is 1 and the TBTT information length 1970 is a value not 0, a BSS of a neighbor AP and information of a channel may be included in the TBTT information field 1940 in the scanning frame transmitted by the AP. The STA may redirect the AP that performs scanning on the basis of the BSS of the neighbor AP and the channel information included in the TBTT information field 1940. TBTT information length field 1970 may indicate whether BSSID is included in the TBTT information field 1940. For example, It may be assumed that the length of the TBTT offset 1980 included in the TBTT information field 1940 is 1 octet and the length of the BSSID field included in the TBTT information field is 6 octet. In this case, when the TBTT information length field 1970 is 1, BSSID field 1990 may not be included in the TBTT information field 1940. Also, when the TBTT information length field 1940 is 7, BSSID field 1990 may be included in the TBTT information field 1940.

Also, the TBTT information field type 1950 of the scanning frame received by the STA may be set to 1 and the TBTT information length 1970 may be set to 0. When the TBTT information length 1970 is 0, it may indicate that information (e.g., a BSSID) for specifying the AP is not included in the TBTT information field 1940. In this case, the STA may redirect a scanning band or a scanning channel to a different band or a different channel on the basis of the operating class 1920 and information of the channel number 1930.

The operating class 1920 having a length of 1 octet may include a band and bandwidth information of primary channels of a plurality of APs included in the neighbor AP information field. The operating class may also be expressed as a term of a band field.

The channel number 1930 having a length of 1 octet may indicate information regarding primary channels of a plurality of APs included in the neighbor AP information field. The channel number may be defined through an operating class. The channel number may also be expressed as a term of a channel field.

The TBTT information field 1940 may include a TBTT offset 1980, a BSSID 1990, and an optional subelement 1995.

The TBTT offset 1980 may have a length of 1 octet, and indicate an offset by TU. The TBTT offset 1980 may be a value rounded down to the nearest TU.

The TBTT offset 1980 may include information regarding an offset from a previous TBTT, of an AP which has transmitted the element, to a subsequent TBTT. When the value of the TBTT offset 1980 is 254, it may indicate an offset of 254 TU or may indicate an offset having a greater value. A value 255 of the TBTT offset 1980 may be used to indicate an unknown offset value.

For example, when the TBTT offset 1980 is included in the prove response frame or the FILS discovery frame, the TBTT offset indicates the offset in TUs, rounded down to nearest TU, to the next TBTT of an AP from the immediately prior TBTT of the AP that transmits this element. When included in Beacon frame, it indicates the offset in TUs, rounded down to nearest TU, to the next TBTT of an AP from the TBTT of the Beacon frame it is included in.

The BSSID 1990 may include identifier information of an AP that the STA redirects and performs scanning. The BSSID may also be expressed as a term of an ID field.

When the TBTT information field type 1950 is set to 1 and the TBTT information length 1970 is set to a value not 0, the BSSID 1990 included in the TBTT information field 1940 may indicate a target AP for redirection. For another example, when the TBTT information length 1970 is 7, the BSSID included in the TBTT information field may be indicate the neighbor AP which may transmit a probe request frame. Namely, in order to allow the STA to transmit a probe request frame including the BSSID 1990 of the redirect AP, the BSSID 1990 may be included in the TBTT information field 1940 and transmitted. The STA may redirect the AP by transmitting the probe request frame including the BSSID 1990 received through a channel indicated in the neighbor AP information field 1900.

A specific operation of the AP may be performed as follows.

When the AP determines that an operating channel is congested so it cannot accommodate the STA, the AP may include at least one neighbor AP information element 1900 having the following setting in the reduced neighbor report element and transmit the same to the STA. The TBTT information field type 1950 included in the TBTT information header 1910 of the neighbor AP information element 1900 of the reduced neighbor report element transmitted by the AP may be set to 1 and transmitted. When the TBTT information type field included in the TBTT information header is 1, STA may switch to the channel, the band, or the neighbor AP base on information included in the reduced neighbor report.

The STA may change a band for performing scanning from a current band to a different band or change a scanning target AP to a different AP of a current channel, on the basis of a probe response frame including the reduced neighbor report element. The AP may determine whether a current channel is congested through various methods.

At least one neighbor AP information element 1900 in which the TBTT information field type 1950 is set to 1 in the FILS discovery frame, like that of the probe response frame, may be included in the reduced neighbor report element. When the STA performs passive scanning, the AP may include one or more neighbor AP information elements in which the TBTT information field type 1950 is 1, in the TBTT information header 1910 of the neighbor AP information field 1900 of the reduced neighbor AP report of the probe response frame in a beacon frame and/or an FILS discovery frame, and transmitted. By transmitting such a beacon frame and/or FILS discovery frame, the AP redirect the STA to a different AP of a current channel or an AP of a different band.

Namely, on the basis of the reduced neighbor report element included in the beacon frame, the FILS discovery frame, or the probe response frame transmitted by the AP, the STA may switch a scanning target AP to a different AP of a current operating channel, an AP of a band different from a current operating band, and an AP operating in a different channel of the current operating band.

The STA may discover that the TBTT information field type 1950 was set to 1 and the TBTT information length 1970 was set to 0 in the TBTT information header 1910 of the neighbor AP information element 1940 of the reduced neighbor report element. In this case, the STA may switch a scanning band or a scanning channel to a different band or a different channel of a current band on the basis of the operating class 1920 and the channel number 1930. As described above, when the TBTT information length 1970 is 0, it may indicate that the BSSID 1990 for specifying an AP is not included in the information field 1940. Namely, the STA may monitor the beacon frame or the FILS discovery frame or transmit a probe request frame in the indicated channel or band.

The STA may discover that the TBTT information field type 1950 was set to 1 and the TBTT information length 1970 was set to a value, not 0, in the TBTT information header 1910 of the neighbor AP information field 1900 of the reduced neighbor report element. In this case, the STA may be switched to an AP having the BSSID 1990 indicated in the TBTT information field 1940. As described above, when the TBTT information length 1970 is not 0, it may indicate that the BSSID 1990 for specifying an AP is included in the information field 1940. The STA may obtain the BSSID indicated in the TBTT information field and unicast a probe request frame on the basis of the BSSID, to thus redirect an AP that performs a scanning procedure.

The STA may determine whether the BSSID is included in the TBTT information field based on the TBTT length information 1970. For example, It may be assumed that the length of the TBTT offset included in the TBTT information field 1940 is 1 octet and the length of the BSSID field included in the TBTT information field is 6 octet. In this case, when the TBTT information length field 1970 is 1, the STA determines that BSSID field 1990 may not be included in the TBTT information field 1940. Also, when the TBTT information length field 1940 is 7, the STA may determines that BSSID field 1990 may be included in the TBTT information field 1940. When multiple neighbor AP information fields included in the reduce neighbor report have their TBTT Information Field Type value set to 1, then the STA may user one of the multiple neighbor AP information fields (for example, the information in the first neighbor AP information field) for redirection purposes.

The TBTT information field may also be expressed in a different form.

Figure 20:
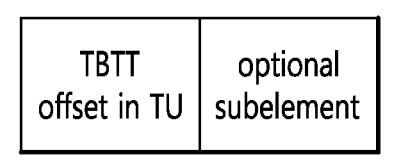

FIG. 20 is a conceptual view illustrating a TBTT information field according to an embodiment of the present invention.

Referring to FIG. 20, the TBTT information field may include a TBTT offset by TU and an optional subelement.

When the TBTT information field type is set to 1 and the TBTT information length subelement is set to a value, not 0, the BSSID may allow a single subelement to be included in the TBTT information field and the STA to transmit a probe request frame including a BSSID of a redirect AP.

The optional subelement field format may include one or more subelements. Each subelement may include a subelement indicator field having 1 octet, a length field having 1 octet, and a data field having various lengths.

Table 9 below shows an optical subelement with respect to TBTT information.

TABLE 9

| Subelement ID | Name | Length field (octets) | Extensible |
|---|---|---|---|
| 0 | BSSID | 6 | |
| 1-225 | Reserved | | |

Figure 21:
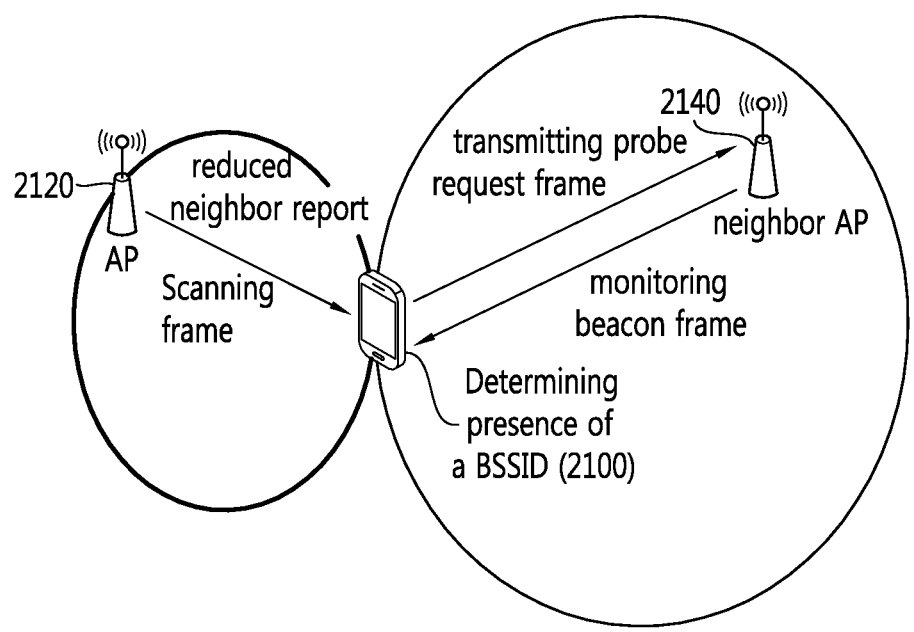
FIG. 21 is a conceptual view illustrating redirection of an STA according to an embodiment of the present invention.

FIG. 21 is a conceptual view illustrating redirection of an STA according to an embodiment of the present invention.

Referring to FIG. 21, an AP 2120 may determine that it may not be able to accommodate an STA 2100 in a first band. In this case, the AP 2120 may transmit a scanning frame (a beacon frame, an FILS discovery frame, or a probe response frame) including a reduced neighbor report to the STA 2100.

The AP 2120 may include a neighbor AP information field in which a TBTT information field type is 1 in a TBTT information header of a neighbor AP information field of a reduced neighbor report element of a beacon frame, an FILS discovery frame, or a probe response frame, and transmit the same. When the beacon frame, an FILS discovery frame, or a probe response frame is received, the STA 2100 may redirect a band set for an initial link from a current band to a different band, or may redirect a channel set for an initial link from a current channel to a different channel.

The STA 2100 may discover that the TBTT information field type was set to 1 and the TBTT information length subfield was set to 0 in the neighbor AP information field of the received scanning frame. When the TBTT information length subfield was set to 0, it may indicate that a value for specifying a neighbor AP 2140 is not included in the TBTT information field. In this case, the STA 2100 may switch to a different band or a different channel of a current band on the basis of an operating class field and a channel number field of the neighbor AP information field. Namely, the STA 2100 may monitor a beacon frame or an FILS discovery frame or transmit a probe request frame in the indicated channel or band.

In another example, the STA 2100 may discover that the TBTT information field type was set to 1 and the TBTT information length subfield was set to a value, not 0 in a TBTT information header of the neighbor AP information field of the received scanning frame. When the TBTT information length subfield is not 0, it may indicate that BSSID information of the neighbor AP 2140 is included in the TBTT information field. In this case, the STA 2100 may obtain the BSSID included in the TBTT information field, as an identifier of an AP to perform redirection. The STA 2100 may be switched to the neighbor AP 2140 having the BSSID indicated in the TBTT information field. Namely, the STA 2100 may perform a scanning procedure by unicasting a probe request frame including the BSSID indicated in the TBTT information field.

Figure 22:
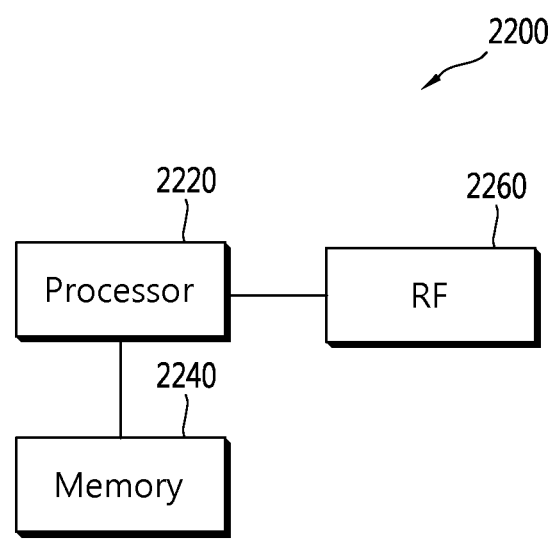
FIG. 22 is a block diagram illustrating a wireless device to which an embodiment of the present invention is applicable.

FIG. 22 is a block diagram illustrating a wireless device to which an embodiment of the present invention is applicable.

Referring to FIG. 22, a wireless device 2200, as a station (STA) that may be able to implement the foregoing embodiment, may be an AP or a non AP STA.

The wireless device 2200 may include a processor 2220, a memory 2240, and a radio frequency (RF) unit 2260.

The RF unit 2260 may be connected to the processor 2220 and transmit and receive a radio signal.

The processor 2220 implements the functions, processes, and/or methods proposed in the present invention. For example, the processor 2220 may be implemented to perform an operation of the wireless device according to an embodiment of the present invention as described above.

For example, when the wireless device is an AP, the processor 2220 may be implemented to determine whether the AP may be able to accommodate an STA, and transmit a scanning frame including scanning redirection information to the STA.

Also, when the wireless device is an STA, the processor 2220 may be implemented to receive a scanning frame including scanning redirection information from an AP and switch to a different neighbor AP, a different band, or a different channel on the basis of the received scanning frame, to perform an initial access operation.

The processor 2220 may include an ASIC (Application-Specific Integrated Circuit), a chip set, a logical circuit, a data processing device, and/or a converter mutually converting a baseband signal and a radio signal. The memory 2240 may include a ROM (Read-Only Memory), a RAM (Random Access Memory), a flash memory, a memory card, a storage medium, and/or any other storage devices. The RF unit 2260 may include one or more antennas transmitting and/or receiving a radio signal.

When the embodiments are implemented by software, the foregoing techniques may be implemented by modules (processes, functions, or the like) performing the foregoing functions. The modules may be stored in the memory 2240 and executed by the processor 2220. The memory 2240 may be provided within or outside the processor 2220 or may be connected to the processor 2220 through a well-known unit.

The invention claimed is:

1. A method for communication in a wireless local area network, the method comprising:
generating, by an access point (AP), a beacon frame to provide neighbor AP information enabling the STA to scan a neighbor AP; and
transmitting, by the AP, the beacon frame including the neighbor AP information to the STA,
wherein the neighbor AP information includes an operating class field and a channel number field,
wherein the operating class field indicates a band of a primary channel of a plurality of neighbor APs, and
wherein the channel number field indicates the primary channel of the plurality of neighbor APs.

2. The method of claim 1,
wherein the neighbor AP information further includes a TBTT information header field and each of a plurality of TBTT information fields for each of the plurality of the neighbor APs,
wherein the TBTT information header field includes a TBTT information count field and a TBTT information length field,
wherein the TBTT information count field includes information on a number of the plurality of the TBTT information fields,
wherein the TBTT information length field includes information on a length in octet of one TBTT information field included in the plurality of TBTT information fields,
wherein the each of the plurality of the TBTT information fields includes information on the each of the plurality of neighbor APs, and
wherein the information on the length is changed depends on whether the each of the plurality of the TBTT information fields includes a basic service set identifier (BSSID) of the each of the plurality of neighbor APs or not.

3. The method of claim 1,
wherein the neighbor AP information further includes a TBTT information header field and each of a plurality of TBTT information fields for each of the plurality of the neighbor APs,
wherein the TBTT information header field includes a TBTT information length field,
wherein the TBTT information length field includes information on a length in octet of one TBTT information field included in the plurality of TBTT information fields,
wherein the each of the plurality of the TBTT information fields includes a TBTT offset field when the information included in the TBTT information length field indicates a first value,
wherein the each of the plurality of the TBTT information field includes the TBTT offset field and a basic service set identifier (BSSID) field when the information included in the TBTT information length field indicates a second value,
wherein the TBTT offset field includes information on a transmission time of a beacon frame, and
wherein the BSSID field includes information to identify a neighbor AP included in the plurality of the neighbor APs.

4. The method of claim 3,
wherein the beacon frame is a frame transmitted by the neighbor AP, and
wherein the transmission time of the beacon frame is determined based on a TBTT of a beacon frame transmitted by the AP in which the TBTT offset field is included.

5. The method of claim 4,
wherein the TBTT information header field further includes a TBTT information field type, and
wherein the TBTT information field type includes information on a structure of the TBTT information field.

6. An access point (AP) for a wireless local area network, the AP comprising:
a radio frequency (RF) unit configured to receive and transmit radio signals; and
a processor operatively coupled with the RF unit and configured to:
generate a beacon frame to provide neighbor AP information enabling the STA to scan a neighbor AP; and
instruct the RF unit to transmit the beacon frame including the neighbor AP information to the STA,
wherein the neighbor AP information includes an operating class field and a channel number field,
wherein the operating class field indicates a band of a primary channel of a plurality of neighbor APs, and
in which the STA conducts the initial link setup when the STA is conducting the initial link setup from current band to the other band,
wherein the channel number field indicates the primary channel of the plurality of neighbor APs.

7. The AP of claim 6,
wherein the neighbor AP information further includes a TBTT information header field and each of a plurality of TBTT information fields for each of the plurality of the neighbor APs,
wherein the TBTT information header field includes a TBTT information count field and a TBTT information length field,
wherein the TBTT information count field includes information on a number of the plurality of the TBTT information fields,
wherein the TBTT information length field includes information on a length in octet of one TBTT information field included in the plurality of TBTT information fields,
wherein the each of the plurality of the TBTT information fields includes information on the each of the plurality of neighbor APs, and
wherein the information on the length is changed depends on whether the each of the plurality of the TBTT information fields includes a basic service set identifier (BSSID) of the each of the plurality of neighbor APs or not.

8. The AP of claim 6,
wherein the neighbor AP information further includes a TBTT information header field and each of a plurality of TBTT information fields for each of the plurality of the neighbor APs,
wherein the TBTT information header field includes a TBTT information length field, wherein the TBTT information length field includes information on a length in octet of one TBTT information field included in the plurality of TBTT information fields, wherein the each of the plurality of the TBTT information fields includes a TBTT offset field when the information included in the TBTT information length field indicates a first value, wherein the each of the plurality of the TBTT information field includes the TBTT offset field and a basic service set identifier (BSSID) field when the information included in the TBTT information length field indicates a second value, wherein the TBTT offset field includes information on a transmission time of a beacon frame, and wherein the BSSID field includes information to identify a neighbor AP included in the plurality of the neighbor APs.

9. The AP of claim 8, wherein the beacon frame is a frame transmitted by the neighbor AP, and wherein the transmission time of the beacon frame is determined based on a TBTT of a beacon frame transmitted by the AP in which the TBTT offset field is included.

10. The AP of claim 9, wherein the TBTT information header field further includes a TBTT information field type, and wherein the TBTT information field type includes information on a structure of the TBTT information field.

* * * * *